United States Patent
Sakai

(10) Patent No.: US 8,363,274 B2
(45) Date of Patent: Jan. 29, 2013

(54) IMAGE FORMING APPARATUS, IMAGE FORMING SYSTEM, AND HEAD DEVICE

(75) Inventor: Hiroaki Sakai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 660 days.

(21) Appl. No.: 12/630,292

(22) Filed: Dec. 3, 2009

(65) Prior Publication Data

US 2010/0157335 A1 Jun. 24, 2010

(30) Foreign Application Priority Data

Dec. 24, 2008 (JP) ................................. 2008-328544

(51) Int. Cl.
*H04N 1/60* (2006.01)
(52) U.S. Cl. ................. 358/1.9; 358/1.8; 347/9; 347/20
(58) Field of Classification Search ................... 358/1.4, 358/1.8, 1.9, 1.16, 3.06, 3.12; 347/1, 3, 5, 347/9, 14, 20, 35
See application file for complete search history.

(56) References Cited

U.S. PATENT DOCUMENTS

| | | | |
|---|---|---|---|
| 5,388,220 A | 2/1995 | Okabayashi | 395/275 |
| 6,092,097 A | 7/2000 | Suzuoka | 709/201 |
| 7,578,574 B2* | 8/2009 | Suzuki | 347/35 |
| 2005/0116972 A1* | 6/2005 | Suzuki | 347/9 |
| 2010/0214618 A1* | 8/2010 | Maehira | 358/3.12 |
| 2012/0218347 A1* | 8/2012 | Itogawa | 347/34 |

FOREIGN PATENT DOCUMENTS

| | | |
|---|---|---|
| JP | 05-173991 | 7/1993 |
| JP | 06-266683 | 9/1994 |

* cited by examiner

*Primary Examiner* — Kimberly A Williams
(74) *Attorney, Agent, or Firm* — DLA Piper LLP (US)

(57) ABSTRACT

An image forming apparatus includes: a plurality of controllers which controls a nozzle group forming an image on an image forming medium on the basis of image data; and a plurality of distribution units which is connected to one or more controllers and transmits the image data, which is used to control the nozzle group controlled by the controller, to the controller. A first distribution unit, which is the uppermost unit, to a second distribution unit, which is the lowermost unit, are connected such that upper and lower distribution units are connected to each other in a communicable way, and the first distribution unit is connected to an external apparatus in a communicable way.

9 Claims, 17 Drawing Sheets

FIG. 2

| ADDRESS | DISTRIBUTION UNIT ID | SETTING INFORMATION |
|---|---|---|
| 0X00000000 | 0 | NUMBER OF COLORS OF IMAGE |
| 0X00000004 | 0 | IMAGE SIZE IN TRANSMISSION DIRECTION |
| 0X00000008 | 0 | IMAGE SIZE IN WIDTH DIRECTION |
| 0X0000000C | 0 | GAIN TARGET COLOR |
| 0X00000010 | 0 | GAIN TARGET LINE |
| 0X000000A0 | 0 | CONNECTION STATUS OF HEAD CONTROLLER |
| . | . | . |
| . | . | . |
| 0X00000100 | 1 | NUMBER OF COLORS OF IMAGE |
| 0X00000104 | 1 | IMAGE SIZE IN TRANSMISSION DIRECTION |
| 0X00000108 | 1 | IMAGE SIZE IN WIDTH DIRECTION |
| 0X0000010C | 1 | GAIN TARGET COLOR |
| 0X00000110 | 1 | GAIN TARGET LINE |
| 0X000001A0 | 1 | CONNECTION STATUS OF HEAD CONTROLLER |
| . | . | . |
| . | . | . |

IMAGE FORMING APPARATUS, IMAGE FORMING SYSTEM, AND HEAD DEVICE

BACKGROUND

1. Technical Field

The present invention relates to an image forming apparatus capable of controlling a nozzle group used to form an image on an image forming medium on the basis of image data.

2. Related Art

There are known line ink jet printers that include a head row ejecting ink to the entire one line of a sheet in a width direction of the sheet and perform printing in the width direction of the sheet without movement of heads. In some line ink jet printers, a plurality of head rows is arranged in a transport direction of a sheet to realize, a high-quality image and multiple colors, for example.

In the line ink jet printers, for example, the head row is constituted by a plurality of heads and a plurality of head controllers each controlling a head (a nozzle group formed by each head) is provided. In the line ink jet printers, for example, image data received from a PC (Personal Computer) are required to be transmitted to the plurality of head controllers.

For example, in order for distribution units formed on one board to transmit the image data to the plurality of head controllers, a plurality of data output ports (slots) of the head controllers has to be disposed on the board. In this case, it is difficult to physically realize this structure since numerous wirings are disposed on the board. Moreover, a problem may arise in that noise is increased.

In order to solve this problem, a line ink jet printer has been suggested which includes a plurality of distribution units connectable to a plurality of head controllers, which transmits image data to the plurality of distribution units from a PC, and which transmits the image data to the head controllers connected to the distribution units. In this case, the PC has to transmit the image data to the plurality of distribution units.

For example, a data communication technique used when a plurality of units (apparatuses) exist is disclosed in JP-A-5-173991 and JP-A-6-266683.

In the line ink jet printers, it is necessary to transmit image data from the PC at a high speed. Therefore, in order to transmit the image data to the plurality of distribution units, output ports (slots) for high-speed data transmission have to be disposed in the PC. For this reason, a problem may arise in that the cost is increased. Moreover, only a limited number of output ports for the high-speed data transmission is formed in the PC. Therefore, in some cases, a number of distribution units may not be dealt with.

SUMMARY

An advantage of some aspects of the invention is that it provides a technique capable of appropriately and efficiently transmitting image data to a plurality of distribution units of an image forming apparatus.

According to an aspect of the invention, there is provided an image forming apparatus including: a plurality of controllers which controls a nozzle group forming an image on an image forming medium on the basis of image data; and a plurality of distribution units which is connected to one or more controllers and transmits the image data, which is used to control the nozzle group controlled by the controller, to the controller. Upper and lower distribution units are connected to each other in a communicable way from a first distribution unit, which is the uppermost unit, to a second distribution unit, which is the lowermost unit. The first distribution unit is connected to an external apparatus in a communicable way. The distribution unit includes an image receiving section which receives the image data of the entire image of an image forming target from the external apparatus or the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit.

According to the image forming apparatus, the first distribution unit can receive the image data of the entire image from the external apparatus, and the first to the lower distribution units can appropriately sequentially transmit the image data of the entire image. Each distribution unit can appropriately extract the necessary image data, which is the data necessary for control of the controller of each distribution unit, from the image data of the entire image. Accordingly, the necessary image data can appropriately be transmitted to each distribution unit.

In the image forming apparatus, nozzles of the nozzle group may line up in a direction intersecting a transport direction of the image forming medium. The image data of the entire image received by the image receiving section may have a data format in which pixel data from the forefront pixel to the last pixel in the transport direction are sequentially arranged in each line oriented in the transport direction of the image. According to the image forming apparatus, it is possible to appropriately receive the image data of the data format in which pixel data from the forefront pixel to the last pixel in the transport direction are sequentially arranged in each line oriented in the transport direction of the image. Accordingly, the image data can rapidly be received from the external apparatus capable of efficiently transmitting the image data having the data format.

The image forming apparatus may further include a memory which stores the necessary image data extracted by the extraction section. The memory may include a plurality of memory blocks each having a capacity of successively arranging and storing the pixel data, which are supplied to control all of the nozzles oriented in a direction perpendicular to the transport direction and controlled by the controller connected to the distribution unit, by the number of pixels of the image in the transport direction. The image forming apparatus may further include a storage section storing each pixel data of the necessary image data at a position corresponding to the controlling target nozzle in the memory blocks. According to the image forming apparatus, it is possible to store the pixel data supplied to control all of the nozzles oriented in the direction perpendicular to the transport direction and controlled by the controller connected to the distribution unit. Moreover, it is possible to store each pixel data at the position corresponding to the nozzle. Accordingly, the process of reading the pixel data from the memory block can be performed in common irrespective of the size of the original image.

In the image forming apparatus, the nozzle group controlled by the controller connected to the distribution unit may be disposed so as to form an image of pixels of some lines in a direction perpendicular to the transport direction. The extraction section may extract pixel data of pixels of lines of an image, which is formed by the nozzle group controlled by the controller connected to the distribution unit, as the necessary image data. According to the image forming apparatus, the distribution unit can appropriately extract the necessary image data used to perform the image of the pixels of the lines of an image in the width direction.

In the image forming apparatus, the nozzle group controlled by the controller connected to the distribution unit may form the image of some colors of plural colors contained in the entire image. The extraction unit may extract pixel data of color pixels of an image, which is formed by the nozzle group controlled by the controller connected to the distribution unit, as the necessary image data. According to the image forming apparatus, the distribution unit can appropriately extract the necessary image data used to form the image of the allocated colors.

In the image forming apparatus, the second distribution unit may be connected to the external apparatus in a communicable way. The image transmitting section of the second distribution unit may transmit the image data of the entire image to the external apparatus. According to the image forming apparatus, it is possible to grasp the transmission state of the entire image data in the external apparatus.

The image forming apparatus may further include an extraction condition receiving section which receives the extraction condition from the external apparatus. According to the image forming apparatus, it is possible to appropriately set the extraction condition of the necessary image data from the external apparatus.

According to another aspect of the invention, there is provided an image forming system including: a processing apparatus which generates image data of an entire image; and an image forming apparatus which forms the image on the basis of the image data. The processing apparatus includes a transmission unit transmitting the image data to the image forming apparatus. The image forming apparatus includes a plurality of controllers which controls a nozzle group forming the image on the image forming medium on the basis of the image data and a plurality of distribution units which is connected to one or more controllers and transmits the image data, which is used to control the nozzle group controlled by the controller, to the controller. Upper and lower distribution units are connected to each other in a communicable way from a first distribution unit, which is the uppermost unit, to a second distribution unit, which is the lowermost unit. The first distribution unit is connected to an external apparatus in a communicable way. The distribution unit of the image forming apparatus includes an image receiving section which receives the image data of the entire image of an image forming target from the transmission unit or the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit.

According to the image forming apparatus, the first distribution unit can receive the image data of the entire image from the external apparatus. It is possible to appropriately transmit the image data of the entire image sequentially from the first distribution unit to the lower distribution unit. Moreover, each distribution unit can appropriately extract the necessary image data, which is the data necessary for the control of the controller of each distribution unit, from the image data of the entire image.

According to still another aspect of the invention, there is provided a head device including: a head which is provided with a nozzle group forming an image on an image forming medium; one or more controllers which control the nozzle group of the head on the basis of image data; and distribution units which are connected to one or more controllers and transmit the image data, which is used to control the nozzle group controlled by the controller, to the controller. The distribution unit is connected to an upper distribution unit in a communicable way and connected to a lower distribution unit in a communicable way. The distribution unit includes an image receiving section which receives the image data of the entire image of an image forming target from the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit. According to the head device, it is possible to appropriately extract the necessary image data, which is the data necessary for the control of the controller, from the image data of the entire image.

BRIEF DESCRIPTION OF THE DRAWINGS

The invention will be described with reference to the accompanying drawings, wherein like numbers reference like elements.

FIG. 2 is an explanatory diagram illustrating distribution unit setting information according to the first embodiment of the invention.

DESCRIPTION OF EXEMPLARY EMBODIMENTS

Exemplary embodiments of the invention will be described with reference to the accompanying drawings. The invention of the claims is not limited to the embodiment described below. Moreover, all constituent elements and all combinations thereof are not essential in solutions of the invention.

First, an image forming system including a line ink jet printer (hereinafter, referred to as a printer), which is an example of an image forming apparatus according to a first embodiment of the invention, will be described.

Figure 1:
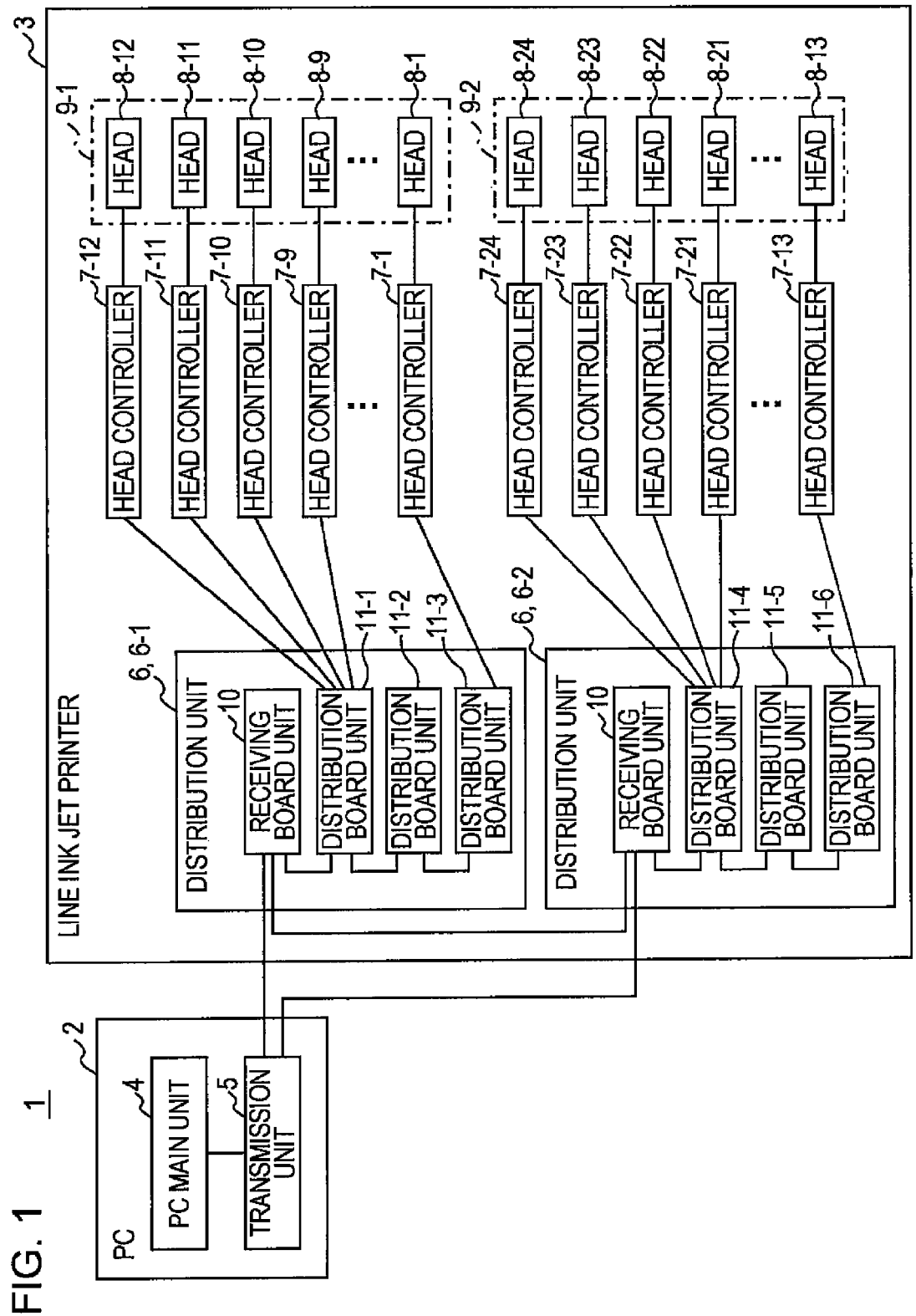
FIG. 1 is a diagram illustrating the configuration of an image forming system according to a first embodiment of the invention.

FIG. 1 is a diagram illustrating the configuration of the image forming system according to the first embodiment of the invention.

An image forming system 1 includes a PC (Personal Computer) 2 and a printer 3.

The PC 2 includes a PC main unit 4 and a transmission unit 5. For example, the PC main unit 4 includes a CPU (Central Processing Unit), a ROM (Read-Only Memory), and a RAM (Random Access Memory). The PC main unit 4 generates image data to be printed by the printer 3 and transmits the generated image data to the transmission unit 5. The transmission unit 5 generates image data for the printer 3 on the basis of the image data received from the PC main unit 4. The transmission unit 5 generates the image data for each color (for example, C (cyan), M (magenta), Y (yellow), and K (black)) of one entire image, which is to be formed by the printer 3. In this embodiment, for example, the transmission unit 5 performs color conversion from RGB to CMYK, nozzle correction, or the like. The transmission unit 5 sequentially transmits the image data for each color to the printer 3. The transmission unit 5 transmits distribution unit setting information used to set distribution units 6 of the printer 3.

FIG. 2 is an explanatory diagram illustrating the distribution unit setting information according to the first embodiment of the invention.

In this embodiment, the distribution units 6 are capable of setting some of the information necessary in distribution units 6-1 and 6-2 to internal resisters (not shown) on the basis of the distribution unit setting information transmitted from the transmission unit 5. The distribution unit setting information is information formed by associating a distribution unit ID used to specify the distribution unit 6 with the number of colors of the image data, an image size in a transmission direction, an image size in a width direction, a color (gain target color) of the image data to be gained by the distribution unit 6, a line of the image data to be gained by the distribution unit 6, and connection status information of a head controller.

Here, the connection status information of the head controller refers to information indicating the connection status (connection or no connection) of a head controller 7 to a slot 27 of a distribution board unit 11 of the corresponding distribution unit 6. For example, each one bit is allocated as data indicating the connection status of each slot 27. When the head controller 7 is connected to the corresponding slot 27, a bit is set to "1". When the head controller 7 is not connected to the slot 27, the bit is set to "0". The slot 27 connected to the head controller 7 to which the image data is transmitted by a destination address generating section 22E can be specified with reference to the connection status information of the head controller to generate the corresponding destination address, even when the head controllers 7 are not connected to some of the slots 27.

Again referring to FIG. 1, the printer 3 includes a plurality of distribution units 6 (6-1 and 6-2), a plurality (for example, twenty four) of head controllers 7-1 to 7-24 (which are denoted as the head controllers 7, when specific head controllers are not described), and a plurality (for example, twenty four) of heads 8-1 to 8-24 (which are denoted as the heads 8, when specific heads are not described).

In the image forming system 1, a ring-type network is formed by the transmission unit 5, the distribution unit 6-1, and the lower distribution unit 6-2. That is, the transmission unit 5 and a receiving board unit 10 of the distribution unit 6-1 are connected to each other in a communicable way, the receiving board unit 10 of the distribution unit 6-1 and a receiving board unit 10 of the lower distribution unit 6-2 are connected to each other in a communicable way, and the receiving board unit 10 of the lower distribution unit 6-2 and the transmission unit 5 are connected to each other in a communicable way.

In this embodiment, one head controller 7 is connected to one head 8 to control the one head 8. Alternatively, one head controller 7 may be connected to the plurality of heads 8 to control the plurality of heads 8.

The distribution unit 6-1 includes the receiving board unit 10 and a plurality of distribution board units 11-1 to 11-3 (which are denoted as the distribution board units 11, when specific distribution board units are not described). The distribution unit 6-2 includes the receiving board unit 10 and a plurality of distribution board units 11-4 to 11-6 (which are denoted as the distribution board units 11, when specific distribution board units are not described). In this embodiment, the plurality (for example, four) of head controllers 7 is connected to one distribution board 11.

Figure 3A:
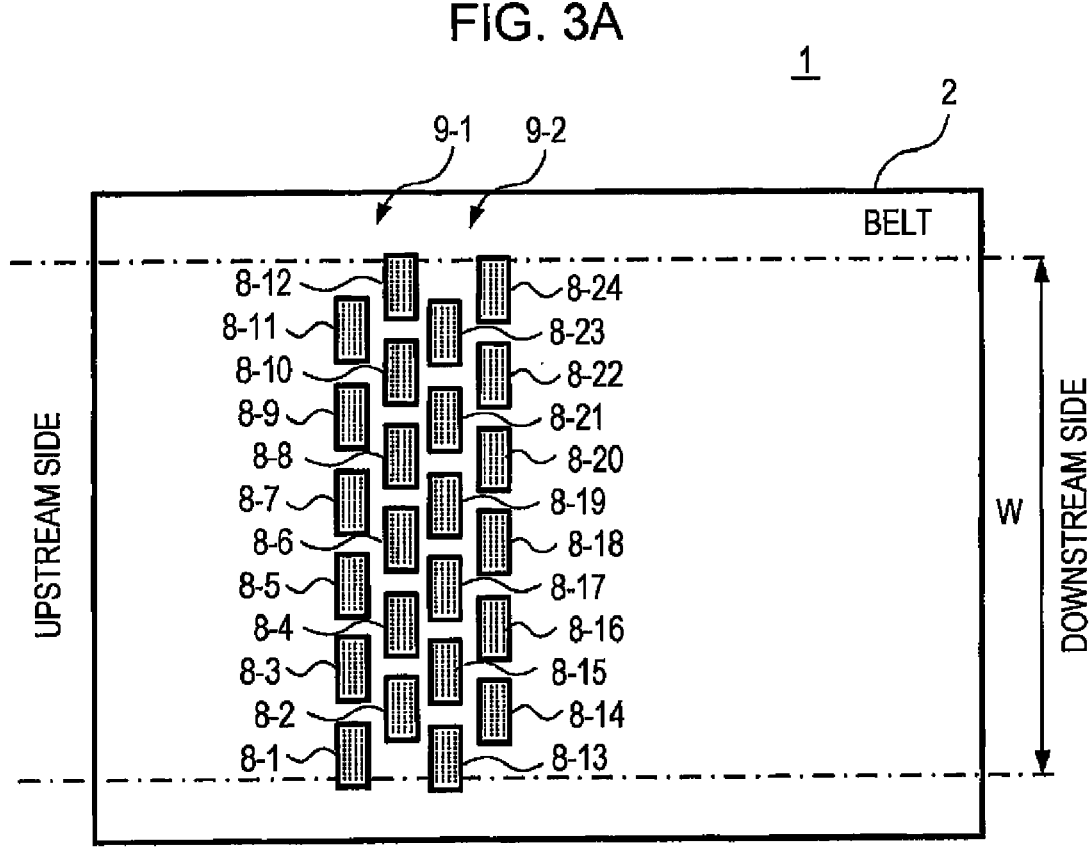
FIGS. 3A and 3B are diagrams illustrating the arrangement and configuration of heads according to the first embodiment of the invention.
Figure 3B:
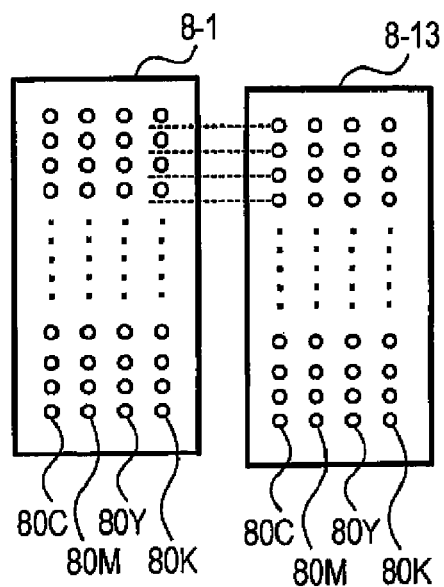

FIGS. 3A and 3B are diagrams illustrating the arrangement and configuration of heads according to the first embodiment of the invention. FIG. 3A shows the arrangement of the heads on the surface of the printer 3. FIG. 3B shows the surfaces of the heads. FIGS. 3A and 3B show the projected shape of nozzles from the upper surface.

The printer 3 is provided with a belt 12 that transports a sheet (image forming medium) such as a paper sheet, an OHP sheet, or a cloth supplied from a feeding tray (not shown). The belt 12 is driven by a motor (not shown). The belt 12 transports the sheet at a substantially uniform speed in a transport direction X, that is, from the upstream side (the left side of FIG. 3A) to the downstream side (the right side of FIG. 3A), when printing (image forming) is performed on the sheet.

The printer 3 is configured to perform the printing on a plurality of sizes of the sheet. In this embodiment, the printer 3 is capable of performing the printing on the various sizes of the sheet up to a width W (maximum printable width), as shown in FIG. 3A. The printer 3 according to this embodiment is configured to transport the substantial middle portion (the substantial middle portion of the belt 12 in a width direction Y of the sheet) of the sheet in the width direction Y of the sheet, and configured not to transport the sheet depending on the size of the sheet.

The printer 3 includes a head row 9-1 constituted by the plurality of heads 8-1 to 8-12 and a head row 9-2 constituted by the plurality of heads 8-13 to 8-24. The head rows 9-1 and 9-2 are configured to eject ink across the maximum printable width W in the width direction Y in accordance with a predetermined resolution. Here, the head row refers to a pair of heads 8 configured to perform the printing across the maximum printable width W.

In each head 8, as shown in FIG. 3B, a plurality of nozzles (a nozzle group: for example, a plurality of nozzles 80C ejecting cyan ink, a plurality of nozzles 80M ejecting magenta ink, a plurality of nozzles 80Y ejecting yellow ink, and a plurality of nozzles 80K ejecting black ink) ejecting ink, which is an example of an image forming material, are disposed to be opposed to the sheet (in a depth direction of the drawing). For example, each head 8 according to this embodiment includes a cyan nozzle line in which the plurality of nozzles 80C (for example, 180 nozzles) for the cyan ink is arranged in the width direction Y, a magenta nozzle line in which the plurality of nozzles 80M for the magenta ink is arranged in the width direction Y, a yellow nozzle line in which the plurality of nozzles 80Y for the yellow ink is arranged in the width direction Y, and a block nozzle line in which the plurality of nozzles 80K for the black ink is arranged in the width direction Y. The nozzle lines are formed side by side in the transport direction X. Each head 8 is provided with piezoelectric vibrators (not shown), which contract and expand in response to a supplied driving signal, so as to correspond to the nozzles (80C, 80M, 80Y, and 80K). By controlling the contraction and the expansion of the piezoelectric vibrators, it is possible to control the ejection of the ink from the nozzles.

As shown in FIG. 3A, the plurality of heads 8 of the head row 9-1 are arranged in zigzags in the width direction Y. The plurality of heads 8 (8-1, 8-3, 8-5, 8-7, 8-9, and 8-11) disposed on the upstream side of the head row 9-1 is arranged at a predetermined interval in the width direction Y. The plurality of heads 8 (8-2, 8-4, 8-6, 8-8, 8-10, and 8-12) disposed on the downstream side of the head row 9-1 is arranged so as to supplement the regions (for example, the spaces between the heads 8) in the maximum printable width which cannot be printed by the heads 8 disposed on the upstream side. In this way, the plurality of heads 8 are arranged so as to eject the ink across the entire the maximum printable width W in the width direction Y with the predetermined resolution.

As shown in FIG. 3A, the plurality of heads 8 of the head row 9-2 are arranged in zigzags in the width direction Y. The plurality of heads 8 (8-13, 8-15, 8-17, 8-19, 8-21, and 8-23) disposed on the upstream side of the head row 9-2 is arranged at a predetermined interval in the width direction Y. The plurality of heads 8 (8-14, 8-16, 8-18, 8-20, 8-22, and 8-24) disposed on the downstream side of the head row 9-2 is arranged so as to supplement the regions (for example, the spaces between the heads 8) in the maximum printable width which cannot be printed by the heads 8 disposed on the upstream side. In this way, the plurality of heads 8 are arranged so as to eject the ink across the entire the maximum printable width W in the width direction Y with the predetermined resolution.

In this embodiment, the nozzles 80C, 80M, 80Y, and 80K of each head 8 of the head row 9-1 and the nozzles 80C, 80M, 80Y, and 80K of each head 8 (the head 8 disposed at the corresponding position in the nozzle row) of the head row 9-2 are different in the arrangement position in the width direction. That is, as shown in FIG. 3B, the nozzles 80C, 80M, 80Y, and 80K of the head 8-1 of the head row 9-1 in the width direction are deviated by the half of a nozzle pitch from the nozzles 80C, 80M, 80Y, and 80K of the counterpart head 8-13 of the head row 9-2 in the width direction. In this way, the nozzles of the counterpart heads 8 of the two head rows are deviated from each other by the half of the nozzle pitch in the width direction Y. Accordingly, when an image is formed by the two head rows 9-1 and 9-2, an image can be formed with the double resolution of the image that is formed just by one head row 9-1.

Figure 4A:
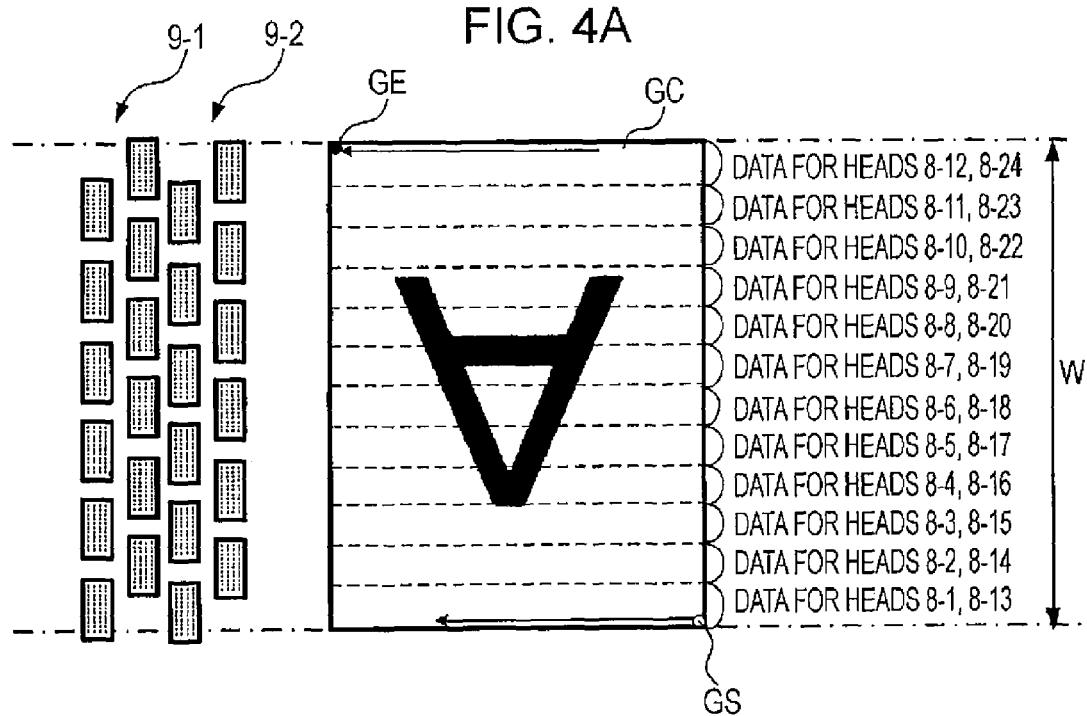
FIGS. 4A and 4B are explanatory diagrams illustrating image data according to the first embodiment of the invention and image data used to control each head.
Figure 4B:
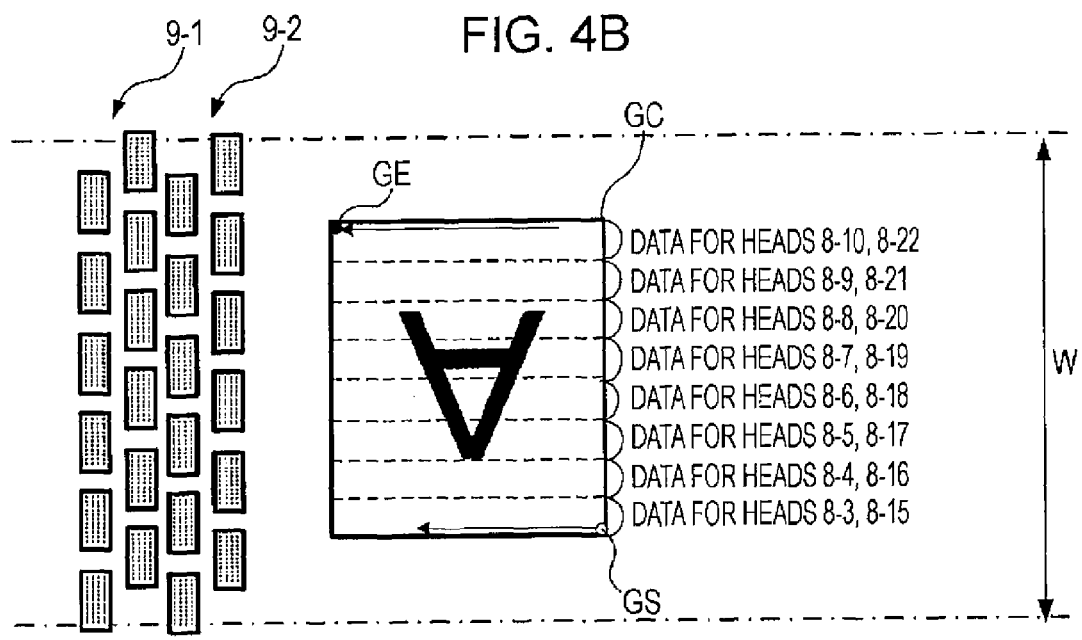
Figure 5:
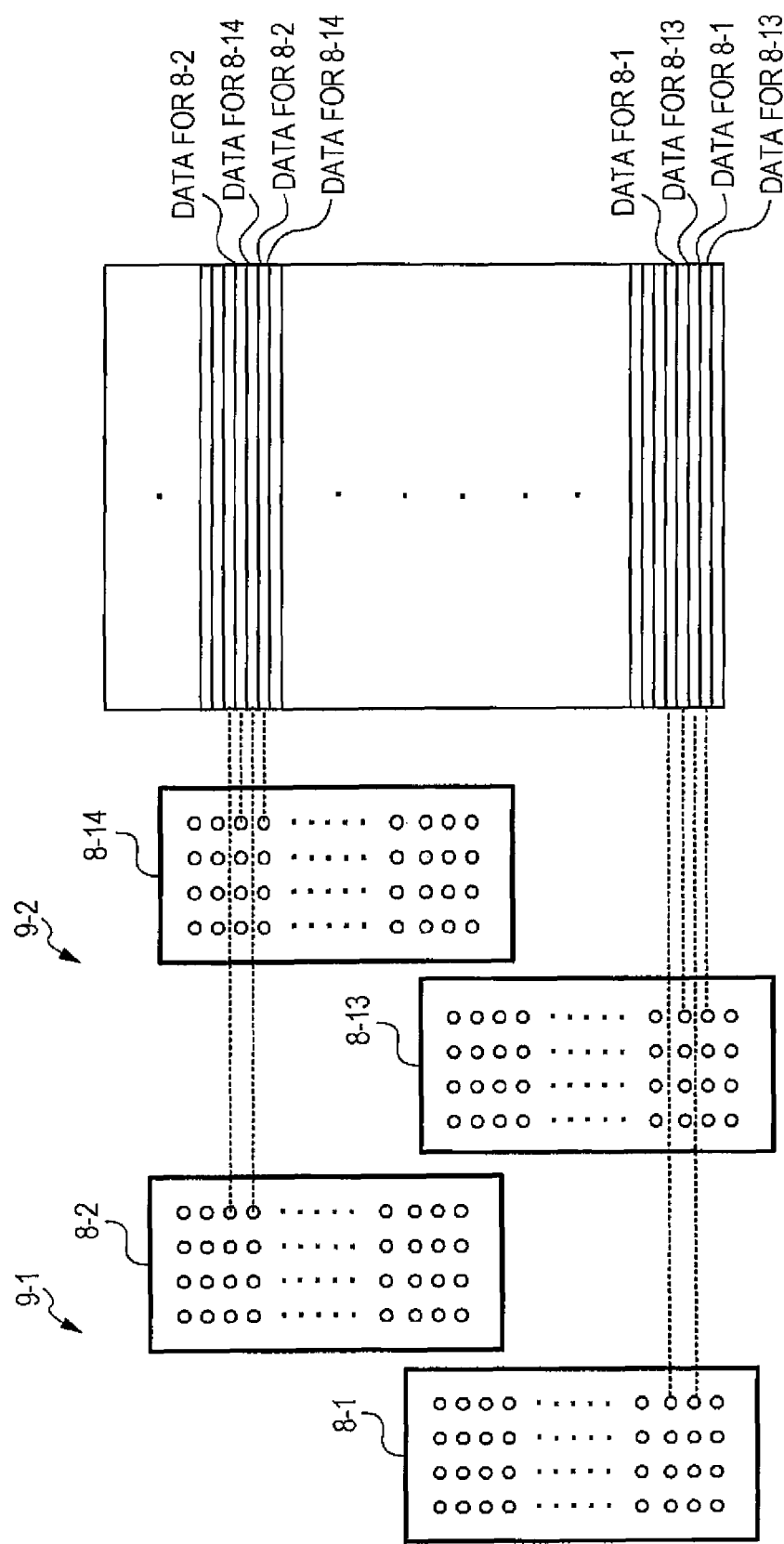
FIG. 5 is an explanatory diagram illustrating the image data according to the first embodiment of the invention and the image data used to control each head.

FIGS. 4A and 4B and FIG. 5 are explanatory diagrams illustrating the image data according to the first embodiment of the invention and image data used to control each head. FIG. 4A is the explanatory diagram illustrating image data for an image having the maximum printable width W. FIG. 4B is the explanatory diagram illustrating image data for an image having a width shorter than the maximum printable width W. FIG. 5 is the explanatory diagram illustrating the details of the image data used to control each head.

In FIG. 4A, a printing target image which is an image having the maximum printable width W is shown. In this case, in each color image data GC of the printing target image stored in a memory (not shown), the transmission unit 5 reads one-line pixel data corresponding to each pixel in order in a direction the reverse of the transport direction X from the pixel data corresponding to a pixel GS which is first printed and located at the corner of an image. Next, the transmission unit 5 reads the pixel data of a line next to (on the upper side of the drawing) the pixel GS in the same manner. In this way, the process of reading the pixel data of each line is repeatedly performed up to the pixel data corresponding to a pixel GE, and then the read image data are transmitted to the printer 3. The image data are used in controlling the heads 8 in charge of the position of each pixel in the width direction Y. In this embodiment, the image data are read in the order of the data for the head 8-1 or the data for the head 8-13, the data for the head 8-2 or the data for the head 8-14, the data for the head 8-3 or the data for the head 8-15, . . . , the data for the head 8-10 or the data for the head 8-22, the data for the head 8-11 or the data for the head 8-23, and the data for the head 8-12 or the data for the head 8-24. In this embodiment, when each color image data GC is generated, a common correction process or the like is formed on reference pixel data, which serves as a reference of a line ejected from the nozzles, in some cases. Therefore, by correcting and writing the data of each line in a memory continuously and reading the pixel data of each line from the memory continuously, it is possible to shorten a time necessary to write and read the data.

In FIG. 4B, a printing target image which is an image having a width shorter than the maximum printable width W is shown. In this case, in each color image data GC of the printing target image, the transmission unit 5 reads one-line pixel data corresponding to each pixel in order in the direction the reverse of the transport direction X from the pixel data corresponding to a pixel GS which is first printed and located at the corner of an image. Next, the transmission unit 5 reads the pixel data of a line next to (on the upper side of the drawing) the pixel GS in the same manner. In this way, the process of reading the pixel data of each line is repeatedly performed up to the pixel data corresponding to a pixel GE, and then the read image data are transmitted to the printer 3. The image data are used in controlling the heads 8 in charge of the position of each pixel in the width direction Y. In this embodiment, the image data are read in the order of the data for the head 8-3 or the data for the head 8-15, the data for the head 8-4 or the data for the head 8-16, . . . , the data for the head 8-9 or the data for the head 8-21, and the data for the head 8-10 or the data for the head 8-22, for example.

In this embodiment, since an image is formed in the width direction by the plurality of head rows 9-1 and 9-2, the head rows belonging to the nozzles forming the pixels adjacent to each other in the width direction are different. Moreover, as for the data of each line in the image data, the data used in the head rows are alternately arranged. For example, as shown in FIG. 5, the data for the head 8-1 of the head row 9-1 and the data for the head 8-13 of the head row 9-2 are alternately arranged in the image data. In addition, the data for the head 8-2 of the head row 9-1 and the data for the head 8-14 of the head row 9-2 are alternately arranged in the same manner.

Figure 6A:
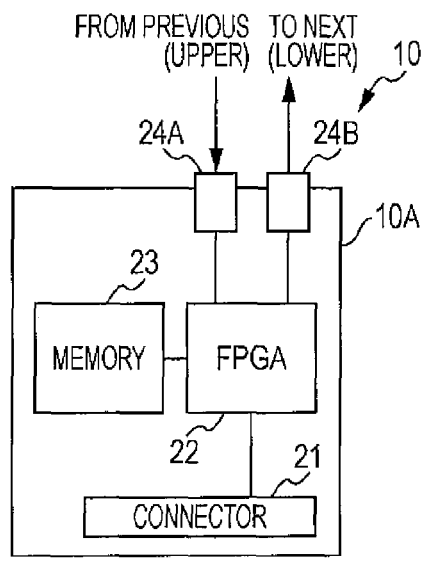
FIGS. 6A to 6C are diagrams illustrating the hardware configuration of distribution units according to the first embodiment of the invention.
Figure 6B:
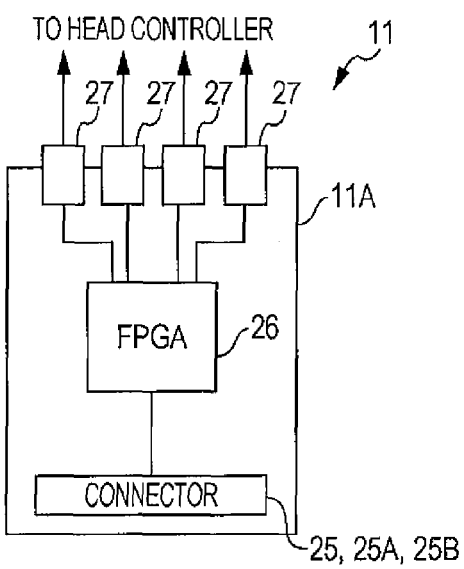
Figure 6C:
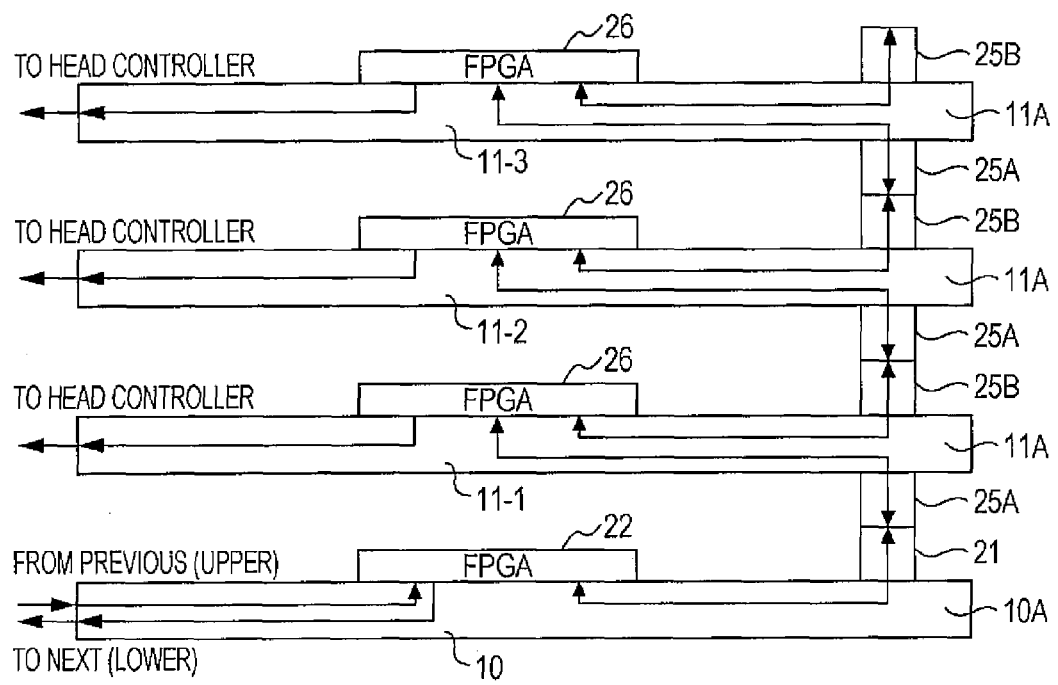

FIGS. 6A to 6C are diagrams illustrating the hardware configuration of distribution units according to the first embodiment of the invention. FIG. 6A shows the configuration of the receiving board unit 10. FIG. 6B shows the configuration of the distribution board unit 11. FIG. 6C shows the connection status of the receiving board units 10 and the distribution board units 11.

In the receiving board unit 10, as shown in FIG. 6A, board 10A is provided with a male connector 21 connected to the uppermost distribution board unit 11-1 among the plurality of distribution board units 11 in a communicable way, a FPGA (Field Programmable Gate Array) 22 executing various operations, a memory 23, a slot 24A connected to a communication line of the previous (upper) unit (the transmission unit 5 or the higher distribution unit 6), and a slot 243 connected to a communication line of the next (lower) unit (the lower distribution unit 6 or the transmission unit 5). Here, the upper portion of the distribution board unit 11 means that the distribution board unit is closer to the receiving board unit 10 in terms of communication.

In the distribution board unit 11, as shown in FIG. 6B, a board 11A is provided with a female connector 25A connected to the upper unit (the receiving board unit 10 or the distribution board unit 11) in a communicable way, a male connector 25B connected to the lower distribution board unit 11 in a communicable way, a FPGA 26 executing various operations, and a plurality (for example, four) of slots 27 connected to communication lines of the plurality of head controllers 7. In this embodiment, one head controller 7 can be connected to the slot 27. Each connector 25A and each connector 253 are located to be substantially symmetric with respect to each board 11A, as shown in FIG. 6C. Since each connector 25A and each connector 25B are disposed in this way, each distribution board unit 11 can be configured to have the same shape. With such a configuration, it is possible to reduce the manufacturing cost of each distribution board unit 11.

In the distribution unit 6, the male connector 21 of the receiving board unit 10 is connected to the female connector 25A of the uppermost distribution board unit 11-1, the male connector 25B of the distribution board unit 11-1 is connected to the female connector 25A of the distribution board unit 11-2, and the male connector 25B of the distribution board unit 11-2 is connected to the female connector 25A of the lowermost distribution board unit 11-3 in this embodiment, as shown in FIG. 6C.

In this embodiment, the upper unit (the transmission unit 5 or the upper distribution unit 6) and the FPGA 22 of the receiving board unit 10 are configured so as to communicate with each other, as shown in FIG. 6C. The FPGA 22 of the receiving board unit 10 and the lower unit (the lower distribution unit 6 or the transmission unit 5) are configured so as to communicate with each other. The FPGA 22 of the receiving board unit 10 and the FPGA 26 of the uppermost distribution board unit 11-1 are configured so as to communicate with each other through the connectors 21 and 25A. The FPGA 26 of the distribution board unit 11-1 and the FPGA 26 of the lower distribution board unit 11-2 are configured so as to communicate with each other through the connectors 25B and 25A. The FPGA 26 of the distribution board unit 11-2 and the FPGA 26 of the lower distribution board unit 11-3 are configured so as to communicate with each other through the connectors 25B and 25A.

Figure 7:
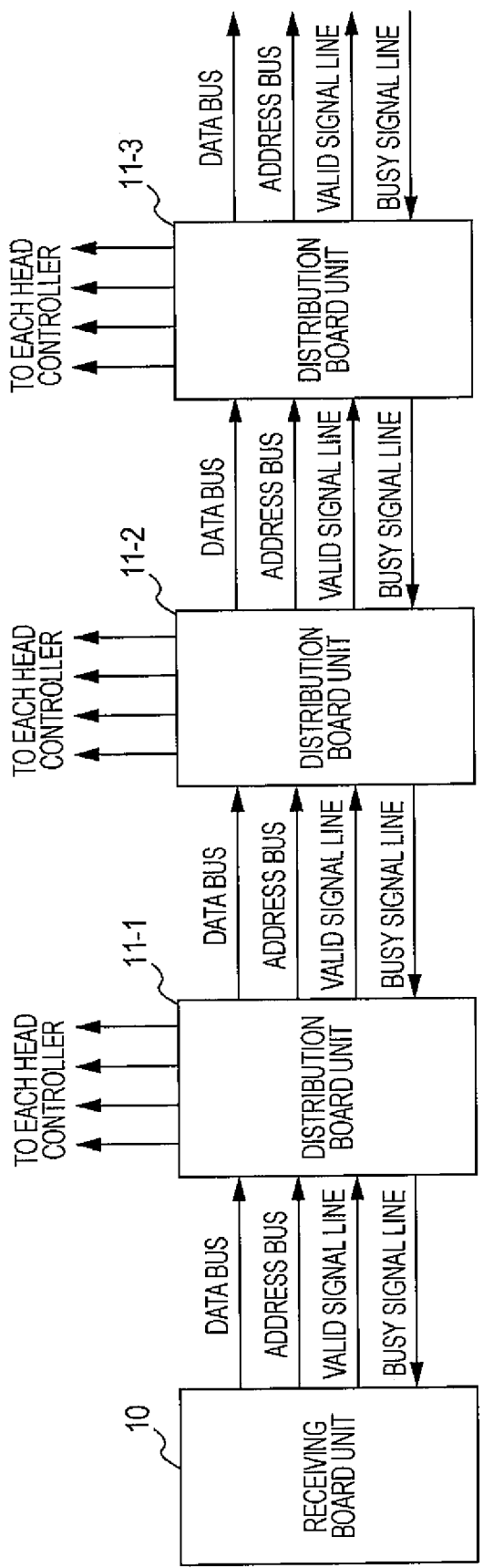
FIG. 7 is an explanatory diagram illustrating signal lines of the distribution units according to the first embodiment of the invention.

FIG. 7 is an explanatory diagram illustrating signal lines of the distribution units according to the first embodiment of the invention.

In the distribution unit 6, the receiving board unit 10 and the plurality of distribution board units 11-1 to 11-3 are cascaded to each other. That is, a data bus, an address bus, a valid signal line used to transmit a valid signal, which is described below, and a busy signal line used to transmit a busy signal, which is described below, are connected between the receiving board unit 10 and the distribution board unit 11-1. A data bus, an address bus, a valid signal line, and a busy signal line are connected between the distribution board unit 11-1 and the distribution board unit 11-2. A data bus, an address bus, a valid signal line, and a busy signal line are connected between the distribution board unit 11-2 and the distribution board unit 11-3.

Figure 8:
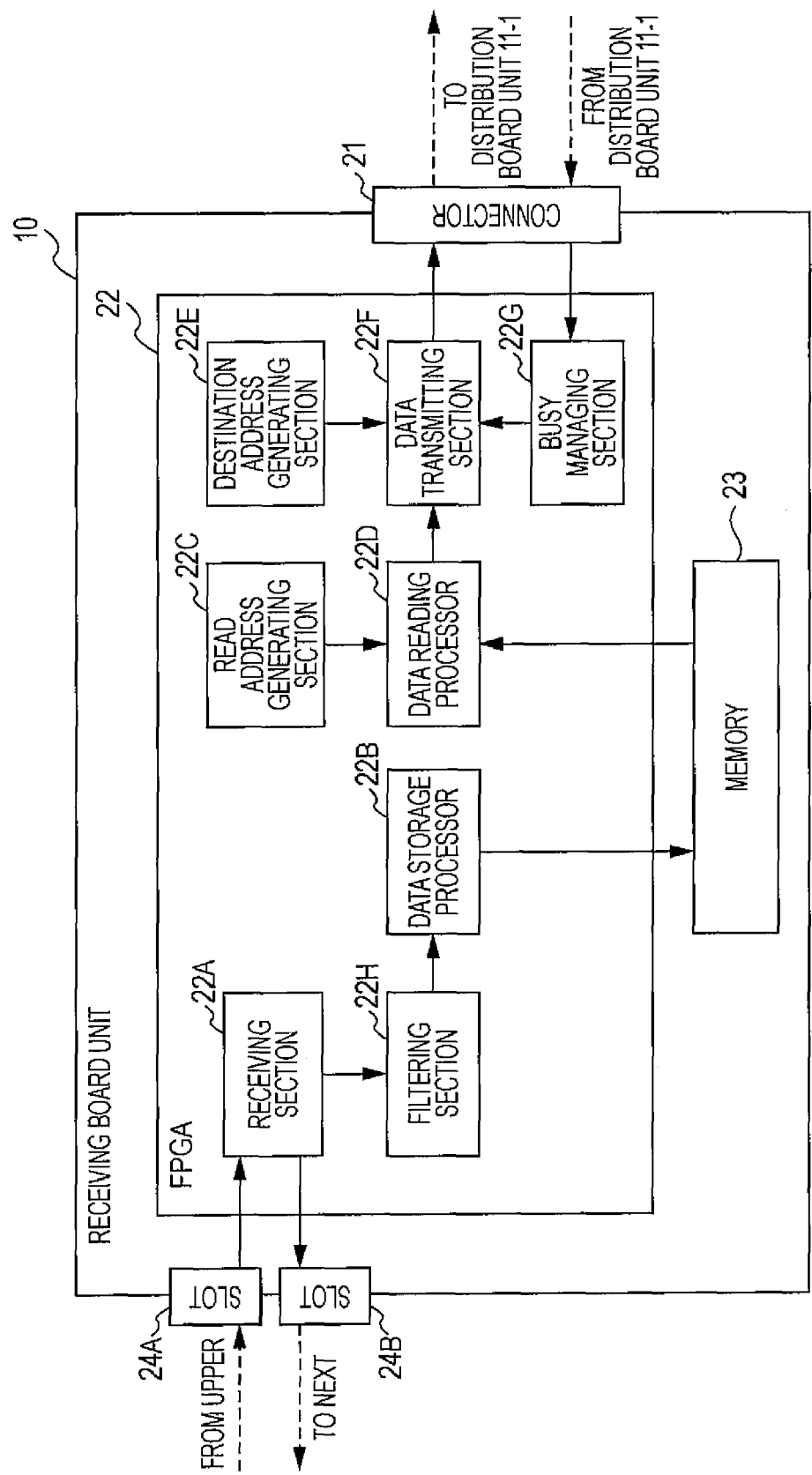
FIG. 8 is a diagram illustrating the functional configuration of a receiving board unit according to the first embodiment of the invention.

FIG. 8 is a diagram illustrating the functional configuration of the receiving board unit according to the first embodiment of the invention.

The FPGA 22 of the receiving board unit 10 includes a receiving section 22A, which is an example of an image receiving section, an image transmitting section, and an extraction condition receiving section, a data storage processor 22B, which is an example of a storage section, a read address generating section 22C, a data reading processor 22D, a destination address generating section 22E, a data transmitting section 22F, a busy managing section 22G, and a filtering section 22H, which is an example of an extraction section.

The receiving section 22A receives the image data, the distribution unit setting information, or the like transmitted from the upper unit (the transmission unit 5 or the upper distribution unit 6) through the slot 24A and transfers the received image data or the like to the filtering section 22H. The receiving section 22A transmits the received image data, the distribution unit setting information, or the like to the next unit (the lower distribution unit 6 or the transmission unit 5) through the slot 24B.

The filtering section 22H gains only data, which are necessary in the head controllers 7 connected to the distribution board unit 11 of the receiving board unit 10, from the image data received from the receiving section 22A, and then transfers the data to the data storage processor 22B. In this embodiment, lines which are gain targets of the image data are set in advance in the filtering section 22H. Only data (necessary image data) of necessary lines are gained from the image data on the basis of the setting (extraction condition).

For example, when the image data shown in FIG. 5 is received from the receiving section 22A, the filtering section 22H of the distribution unit 6-1 gains only the image data of the necessary lines, which are data for the heads 8-1 to 8-12 of the head row 9-1, in the image data. On the other hand, the filtering section 22H of the distribution unit 6-2 gains only the image data of the necessary lines, which are data for the heads 8-13 to 8-24 of the head row 9-2, in the image data.

The data storage processor 22B stores the necessary image data received from the filtering section 22H in the memory 23. In this embodiment, the data storage process 22B successively stores the image data received from the filtering section 22H.

Figure 9:
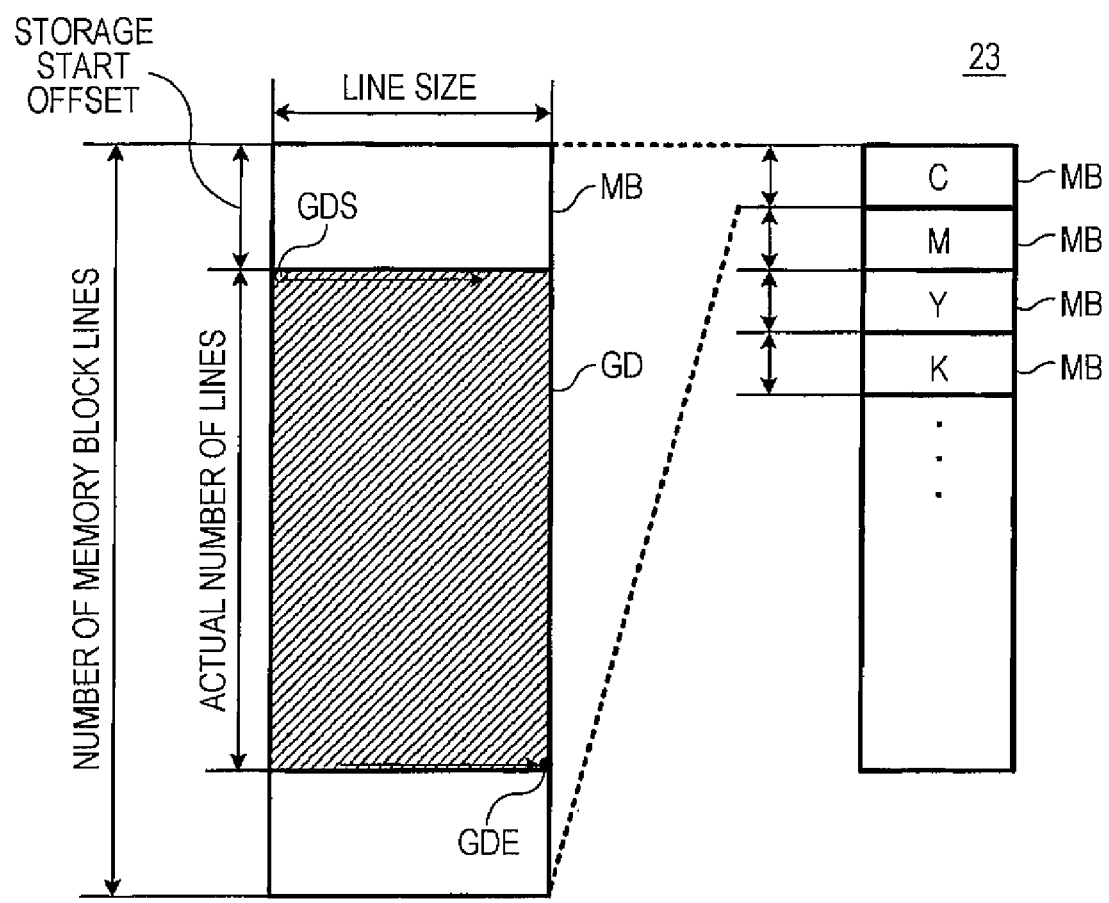
FIG. 9 is an explanatory diagram illustrating an area of a memory according to the first embodiment of the invention.

FIG. 9 is an explanatory diagram illustrating an area of the memory according to the first embodiment of the invention.

As shown in FIG. 9, the data storage processor 22B divides the memory space of the memory 23 into a plurality of memory blocks MB and stores partial data (in this embodiment, the data of lines allocated to the heads 8 connected to the distribution unit 6) of one-color image data of a one-page image, which is necessary in the distribution unit 6, in one memory block MB. For example, when printing image data is formed by four colors of CMYK, the data storage processor 22B stores data of a line allocated to the head 8 connected to the distribution unit 6 in one-page cyan image data, data of a line allocated to the head 8 connected to the distribution unit 6 in one-page magenta image data, data of a line allocated to the head 8 connected to the distribution unit 6 in one-page yellow image data, and data of a line allocated to the head 8 connected to the distribution unit 6 in one-page black image data, in one memory block MB each. In addition, when there is a free memory space in the memory 23, the image data of different pages are also stored.

The memory block MB is configured such that the number of lines capable of storing pixel data constituting the image data is set to the number of nozzles controlled by the head controllers 7 connected to the distribution unit 6 in the total number of nozzles in charge of one-color printing of the maximum printable width W, the size of each line is set to a size storing the pixel data of the line size (the number of pixels constituting an image in the transport direction) of the transmitted image data, and the data of the lines allocated to the heads 8 connected to the distribution unit 6 in one-color image data of an image having the maximum printable width W can be stored. Information on the line size of the transmitted image data or the number of lines in the width direction is configured to be transmitted in advance from the transmission unit 5 before the image data is transmitted.

For example, when the image data has a width smaller than the maximum printable width W as in FIG. 4B, the data storage processor 22B empties an area (storage start offset) storing the data for the nozzles that do not eject ink in printing and stores the necessary image data GD of the lines in charge in the image data GC, as shown in FIG. 9.

As for the necessary image data GD, pixel data that corresponds to a pixel GDS located at the corner first printed in an image corresponding to the necessary image data GD is stored at the upper left of the area and pixel data that corresponds to a pixel GDE located at the corner opposite to the pixel GDS and finally printed is stored at the lower right of the area. The total number of lines stored in the necessary image data GD is set to the actual number of lines of the image corresponding to the necessary image data GD in the entire image.

Figure 10A:
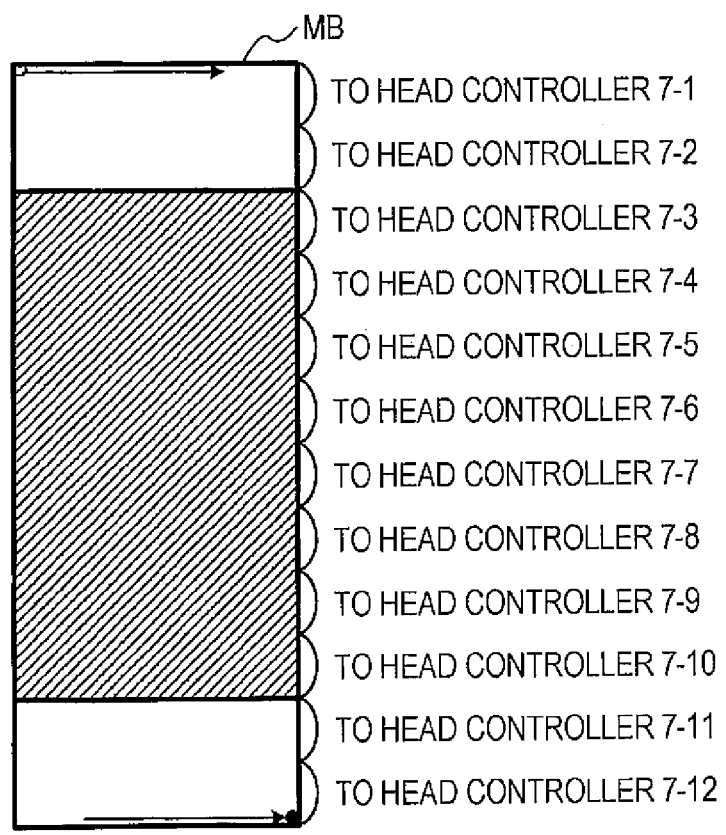
FIGS. 10A and 10B are explanatory diagrams of the state of a memory block and the transmission of the image data according to the first embodiment of the invention.
Figure 10B:
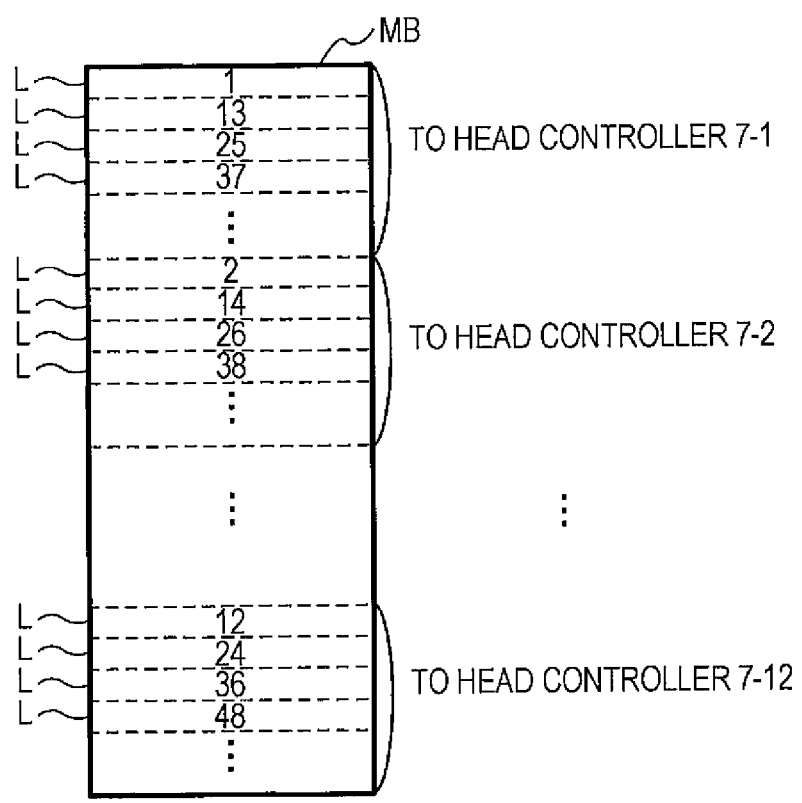

FIGS. 10A and 10B are explanatory diagrams of the state of the memory block and the transmission of the image data according to the first embodiment of the invention. FIG. 10A shows a correspondent relationship between the image data stored in the memory block and the head controller to which the image data is transmitted. FIG. 10B shows a transmission sequence of the lines of the image data.

In sequence from the uppermost area of the memory block MB of the distribution unit 6-1 in which the necessary image data are stored, as shown in FIG. 10A, the image data (the image data for the head 8-1) to be transmitted to the head controller 7-1 is stored, the image data (the image data for the head 8-2) to be transmitted to the head controller 7-2 is stored, the image data (the image data for the head 8-3) to be transmitted to the head controller 7-3 is stored, the image data (the image data for the head 8-4) to be transmitted to the head controller 7-4 is stored, the image data (the image data for the head 8-5) to be transmitted to the head controller 7-5 is stored, and then the image data (the image data for the head 8-12) to be transmitted to the head controller 7-12 is finally stored.

When the image data is the image data for an image of the width allocated to the distribution unit 6-1 and smaller than the maximum printable width W, a NULL value that is stored in advance in the memory block MB and indicates the non-ejection of ink is set to the uppermost and lowermost areas, as shown in FIG. 10A.

In the same way, the image data (the image data for the head 8-13) to be transmitted to the head controller 7-13 to the image data (the image data for the head 8-14) to be transmitted to the head controller 7-24 are stored in the memory block MB of the distribution unit 6-2.

The read address generating section 22C generates the address of the memory 23 from which data are read, and notifies the generated address to the data reading processor 22D. Even when the actual image data is stored in a part of the block MB, the address is generated so as to read all of the data in the memory block MB. Here, since the number of lines of the memory block MB is used in common and the address is generated so as to read all of the data in the memory block MB, the process of generating the address of the memory 23 from which data are read is performed in common irrespective of the size of the original image.

Here, the image data are transmitted from the transmission unit 5 to the receiving board unit 10. The speed at which the distribution board unit 11 transmits the image data to the head controller 7 is slower than the speed at which the image data are stored in the memory 23 and the speed at which the image data are read from the memory 23. For this reason, when the image data are successively transmitted to the same head controller 7, a long time of time is required to finish the transmission of the image data to all the head controllers 7 due to the influence of the speed at which the distribution board unit 11 transmits the image data to the same head controller 7.

In this embodiment, accordingly, the read address generating section 22C is configured to generate addresses at which the image data to be transmitted to the different head controllers 7 all with predetermined N lines (where N is an integer of one or more) are stored, in order to transmit the image data to the different head controllers 7 all with N lines.

For example, when the image data are transmitted to the different head controllers 7 of every line, the addresses shown in FIG. 10B are sequentially generated. That is, the read address generating section 22C generates the address indicating image data L of Line 1, which is transmitted to the head controller 7-1, and then generates the address indicating image data L of Line 2, which is transmitted to the head controller 7-2. In the same way, the read address generating section 22C generates the addresses indicating the data which are transmitted to the head controllers 7-3 to 7-11, and then generates the address indicating the image data L of Line 12, which is transmitted to the head controller 7-12. Again, the read address generating section 22C generates the address indicating the data that is transmitted to the head controller 7-1, and then generates the addresses so as to read all of the data in the memory block MB. In this way, for example, first, thirteen, twenty fifth, thirty seventh, etc. addresses of the data to be transmitted to the head controller 7-1 are generated. Second, fourteen, twenty sixth, thirty eighth, etc. addresses of the data to be transmitted to the head controller 7-2 are generated. Twelfth, twenty fourth, thirty sixth, forty eight, etc. addresses of the data to be transmitted to the head controller 7-12 are generated.

The data reading processor 22D reads the data corresponding to the addresses generated by the read address generating section 22C from the memory 23. In this embodiment, the data reading processor 22D reads one-line data corresponding to the address by N lines and transmits the one-line data to the data transmitting section 22F.

Next, a process of determining the line number N serving as the unit of the image data that is transmitted to each head controller 7 by the read address generating section 22C will be described.

Figure 11:
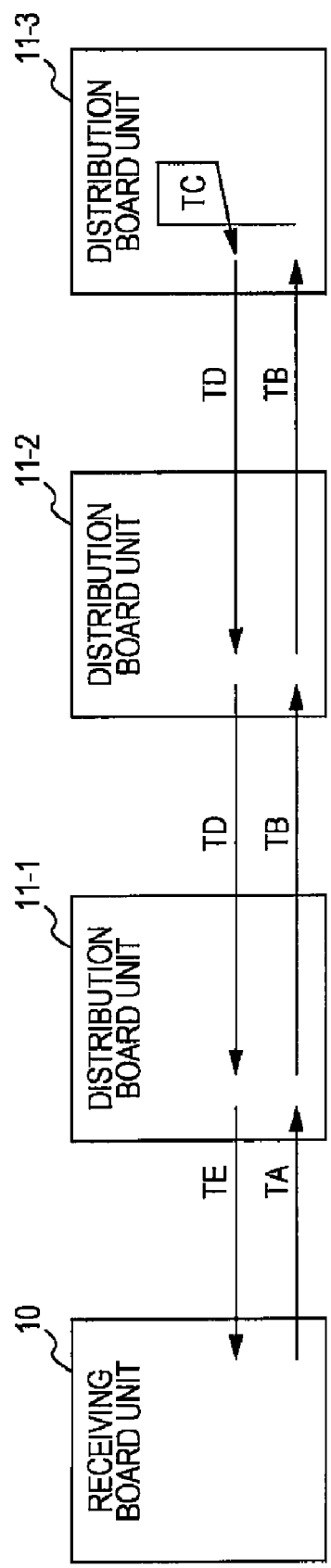
FIG. 11 is an explanatory diagram of delay time of a busy signal according to the first embodiment of the invention.

FIG. 11 is an explanatory diagram of the delay time of a busy signal according to the first embodiment of the invention.

In this embodiment, as described below, when the image data is transmitted to one destination, a busy signal indicating whether to receive the image data from the distribution board unit 11 taking charge of (connected to) the head controller which is the next destination is received simultaneously. Accordingly, the image data cannot be transmitted to the next destination before reception of the busy signal indicating that the image data can be received from the distribution board unit 11 taking charge of the head controller 7 which is the next destination.

In this case, when the transmission of the image data to one destination ends, any image data is not transmitted, thereby deteriorating data transmission efficiency.

Accordingly, in this embodiment, the number of lines of the image data transmitted to one head controller 7 is adjusted in order to permit the image data to be transmitted, until the busy signal is received from the destination.

Here, delay time (delay) relevant to the busy signal is classified into the following five types.

That is, the delay time is classified into: time TA in which address data (the address of the next destination) output from the receiving board unit 10 is latched by the distribution board unit 11-1; time TB in which the address data is latched by the next (lower) distribution board unit 11 after the latch of the address data; time TC in which the address data is latched, busy determination is performed to determine whether the distribution board unit 11 can receive the image data, and then a reply to the previous (upper) distribution board unit 11 is prepared; time TD in which the busy signal is output and then the previous distribution board unit 11 prepares the busy signal to return to the antecedent distribution board unit 11; and time TB in which the busy signal is transmitted from the distribution board unit 11-1 to the receiving board unit 10 and the receiving board unit 10 can determine the busy signal.

In this embodiment, the adjustment of the number of the lines of the image data is determined on the basis of critical path, that is, a path in which the busy signal is returned from the lowest distribution board unit 11-3.

Delay time TL in which the busy signal is returned from the lowest distribution board unit 11-3 is expressed by the following expression.

$$TL = TA + TE + TC + (TB + TD) \times (\text{connection number of distribution board units 11-1})$$

Here, the unit of TA, TB, TC, TD, TE, and TL is the clock number of the reference clock. Each value is measured and stored in advance in the read address generating section 22C.

In this embodiment, the amount of data requiring transmission time more than the delay time–TL is transmitted as the unit to each destination. For example, when one-pixel data is set to one bit, the line number N satisfying a relation of TL×width of data bus (bit/one clock)≦one line size×N is determined as the unit of the data to be transmitted to each destination. In this way, it is possible to reduce the time, during which the data is not transmitted, before reception of the busy signal.

The destination address generating section 22E generates an address (destination address: destination identity information) indicating the head controller 7, which is the destination of the image data read by the data reading processor 22D, and outputs the generated address to the data transmitting section 22F. The head controller 7 which is the destination is the head controller 7 which will transmit the data corresponding to the address of the memory 23 generated by the read address generating section 22C, and can be determined depending on the arrangement and configuration of the heads 8 of the printer 3 and a rule used when the read address generating section 22C generates the addresses. Since the head controller 7 is connected to one of the slots 27, identity information (slot ID) of the slot 27 connected to the corresponding head controller 7 and identity information (distribution board unit ID) of the distribution board unit 11 owned by the slot 27 are used as the address of the head controller 7 in this embodiment.

In this embodiment, with reference to the connection information of the head controller, it is configured that the slot 27 connected to the head controller 7 which will transmit the image data is specified and the address of the corresponding destination is generated. Accordingly, no problem occurs in the distribution board unit 11, even when there is the slot 27 to which the head controller 7 is not connected. For example, reserve slots 27 to which several head controllers 7 are connected to any one distribution board unit 11 can be guaranteed. In this case, when any one slot 27 is broken down, the reserve slot 27 is connected to the head controller 7. Then, by specifying the address of the slot 27, it is possible to appropriately transmit the image data to the head controller 7.

A new distribution board unit 11 may be connected to the lower region of the distribution board unit 11-3 and the head controller 7 may be connected using the slot 27 of the newly added distribution board unit 11. For example, by receiving and storing the connection information corresponding to the connection states in this case, it is possible to specify the address of the slot 27 connected to the head controller 7 and appropriately transmit the image data to a desired head controller 7.

The destination address generating section 22E generates the address (the address of the next destination: identity information of the next destination) of the head controller 7 which is the next destination, and outputs the generated address to the data transmitting section 22F.

In this embodiment, the destination addresses are managed in the following way.

Figure 12A:
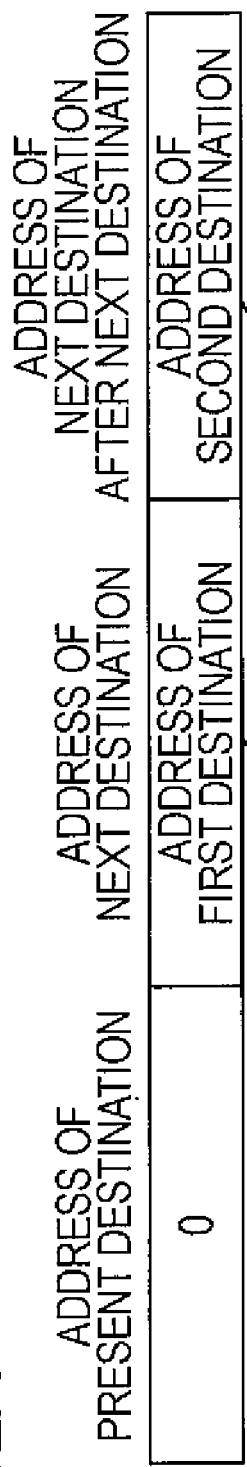
FIGS. 12A to 12C are explanatory diagrams illustrating the management of destination address according to the first embodiment of the invention.
Figure 12B:
Figure 12C:

FIGS. 12A to 12C are explanatory diagrams illustrating the management of destination addresses according to the first embodiment of the invention.

The destination address generating section 22E has a shift resistor constituted by three resistors. The left resistor of the shift resistor stores the address of the present destination, the middle resistor thereof stores the address of the next destination, and the right resistor thereof stores the address of the further destination after the next destination. The shift resistor is configured so that the data of each resistor is moved (shifted) to the left resistor.

When the transmission of the image data starts, as shown in FIG. 12A, the destination address generating section 22E generates the address of a first destination to which the image data is transmitted, stores the generated address in the middle resistor, generates the address of a second destination to which the image data is transmitted, and stores the generated address in the right resistor. Then, the destination address generating section 22E sets the value (initial value of 0) of the left resistor as the address of the present destination, sets the value (the address of the second destination) of the middle resistor as the address of the next destination, and then transmits the addresses to the data transmitting section 22F. In this way, the busy signal for the destination corresponding to the address of the first destination is confirmed.

Next, as shown in FIG. 12B, the destination address generating section 22E shifts the value of the shift resistor, generates the address (the address of a third destination) of the further destination after the next destination, stores the generated address in the right resistor, and sets the value (the address of the first destination) of the left resistor as the address of the present destination, sets the value (the address of the second destination) of the middle resistor as the address of the next destination, and transmits the address to the data transmitting section 22F. In this way, the image data is transmitted to the first destination and the busy signal for the second destination is confirmed.

Next, as shown in FIG. 12C, the destination address generating section 22E shifts the value of the shift resistor to the left side, generates the address of the further destination after the next destination, stores the generated address in the right resistor, sets the value of the left resistor as the address of the present destination, sets the value of the middle resistor as the address of the next destination, and transmits the addresses to the data transmitting section 22F. In this way, the destination address generating section 22E repeatedly performs these operations.

The data transmitting section 22F has an inner memory (temporary storage unit) of a FIFO (First In First OUT) or double buffer structure and temporarily stores the image data from the data reading processor 22D.

The data transmitting section 22F transmits the image data to be transmitted to the destination corresponding to the inner memory, the address of the destination received as the destination of the data, and the address of the next destination received as the next destination to the distribution board unit 11-1 through the connector 21, when the data transmitting section 22F receives a notice indicating that the destination starting the transmission can receive the image data from the busy managing section 22G. In this embodiment, when the image data, the address of the destination, and the address of the next destination are transmitted to the distribution board unit 11-1, these data are transmitted up to the lower distribution board units 11-2 and 11-3. In this embodiment, the data transmitting section 22F transmits one-clock data of the transmitting target image data by the data bus at one clock generated by the FPGA 22, and the address of the destination and the address of the next destination are transmitted by the address bus. In this way, since the one-clock data and the address of the destination are transmitted at one clock, the address of the destination can be changed and transmitted every clock. The data transmitting section 22F transmits a signal indicating that the image data being transmitted is valid, that is, a valid signal of an H (high) state, when the data transmitting section 22F transmits the image data.

On the basis of the busy signal transmitted from the distribution board unit 11-1, the busy managing section 22G determines whether the next destination can receive data and notifies the result to the data transmitting section 22F. In this embodiment, when the destination can receive the data, the busy signal becomes the H (high) state. Alternatively, when the destination cannot receive the data, the busy signal becomes an L (low) state.

Figure 13:
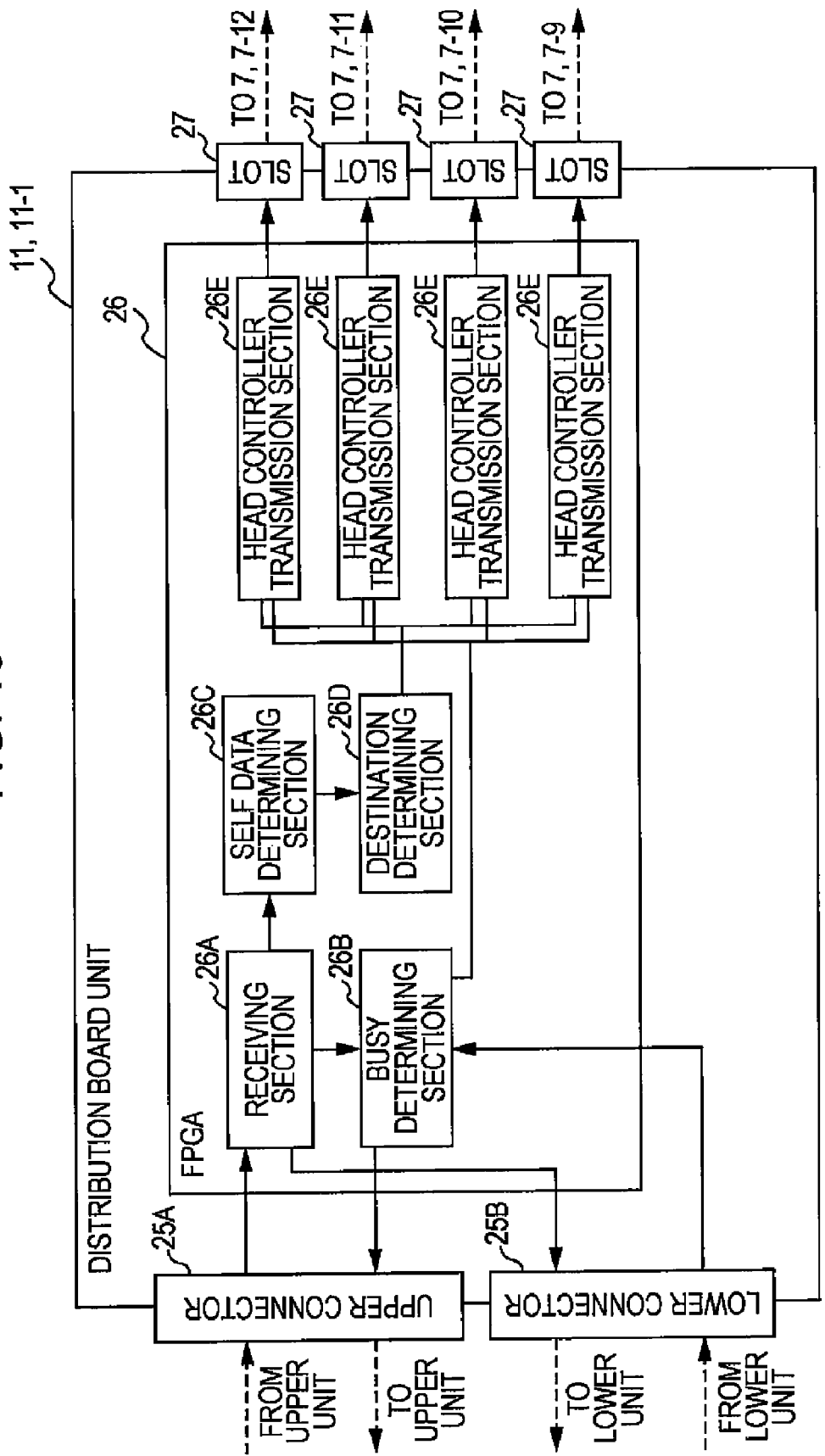
FIG. 13 is a diagram illustrating the functional configuration of a distribution board unit according to the first embodiment of the invention.

FIG. 13 is a diagram illustrating the functional configuration of the distribution board unit according to the first embodiment of the invention.

The FPGA 26 of the distribution board unit 11 includes a receiving section 26A, a busy determining section 26B, a data self-determining section 26C, a destination determining section 26D, and a plurality of head controller transmission sections 26E.

The receiving section 26A receives the clock, the image data, the address of the destination, the address of the next destination, and the valid signal transmitted from the upper connector 25A. When the valid signal indicates that the data is valid (the valid signal is in the H state), the receiving section 26A transfers the image data and the address of the destination to the data self-determining section 26C. Alternatively, when the valid signal indicates that the data is not valid (the valid signal is in the L state), the receiving section 26A destroys the image data and the address of the destination. The receiving section 26A transfers the address of the next destination to the busy determining section 26B. The receiving section 26A transmits the clock generated in this distribution board unit 11 to the lower distribution board unit 11 and also transmits the received image data, the received address of the destination, and the received address of the next destination at the clock. Moreover, the receiving section 26A also transmits the valid signal. Here, since the image data, the address of the destination, and the address of the next destination are transmitted at the clock generated by the distribution board unit 11 itself, the image data, the address of the destination, and the address of the next destination can be transmitted to the lower distribution board unit 11 without mismatch between the clock generated upon the transmission to the distribution board unit 11 and each of the data. Accordingly, the lower distribution board unit 11 can appropriately receive each of the data.

The data self-determining section 26C determines whether the address of the destination received from the receiving section 26A indicates the head controller 7 connected to this distribution board unit 11. Here, whether the address of the destination indicates the head controller 7 connected to this distribution board unit 11 can be determined by whether the identity information (distribution board unit ID) of this distribution board unit is stored in the address of the destination. Here, the identity information of this distribution board unit 11 is set by a dip switch (not shown), for example. The data self-determining section 26C transfers the image data and the address of the destination received from the receiving section 26A to the destination determining section 26D, when the data self-determining section 26C determines that the address of the destination indicates the head controller 7 connected to this distribution board unit 11. Alternatively, the data self-determining section 26C destroys the image data and the address of the destination, when the data self-determining section 26C determines that the address of the destination does not indicate the head controller 7 connected to this distribution board unit 11.

The destination determining section 26D specifies the slot 27 in charge of transmission with reference to the address of the destination received from the data self-determining section 26C. In this embodiment, the slot 27 is specified by the ID of the slot 27 in the address of the destination. The destination determining section 26D transmits the image data to the head controller transmission section 26E connected to the specific slot 27.

The head controller transmission section 26E has an inner memory of the FIFO that temporarily stores the image data to be transmitted to the head controller 7. The head controller transmission section 26E stores the image data transmitted from the destination determining section 26D in the inner memory, takes out the image data from the inner memory, and transmits the image data to the head controller 7 through the slot 27. The head controller transmission section 26E outputs a signal (the busy signal of the H state) indicating that the image data cannot be received, to the busy determining section 26B, when the storage amount of the image data stored in the inner memory of the FIFO exceeds a predetermined threshold value. Otherwise, the head controller transmission section 26E transmits a signal (the busy signal of the H state) indicating that the image data can be received, to the busy determining section 26B. For example, the threshold value may be the storage amount which cannot store the image data corresponding to the N lines, which is the transmission unit.

The busy determining section 26B determines whether the address of the next destination received from the receiving section 26A indicates the head controller 7 connected to this distribution board unit 11. When the address of the next destination indicates the head controller 7 connected to this self distribution board unit 11, the busy determining section 26B specifies the head controller transmission section 26E to which the slot 27 corresponding to the address of the next destination is connected, selects the busy signal transmitted from the head controller transmission section 26E, and transmits the busy signal to the upper unit (the receiving board unit 10 or the distribution board unit 11). Alternatively, when the address of the next destination does not indicate the head controller 7 connected to this self distribution board unit 11, the busy determining section 26B receives the busy signal transmitted from the lower unit (the distribution board unit 11) and transmits the busy signal to the upper unit (the receiving board unit 10 or the distribution board unit 11).

Next, the operation of the image forming system 1 will be described.

In the PC 2, the printing target image data is transferred from the PC main unit 4 to the transmission unit 5, when an image print instruction is given by a user. The transmission unit 5 generates image data of each color (for example, yellow, magenta, cyan, and black) from the image data for the printer 3 and sequentially transmits the image data of each color to the printer 3.

In the printer 3, the receiving section 22A of the distribution unit 6-1 receives the image data of each color transmitted from the transmission unit 5 and transmits the received image data of each color to the next (lower) distribution unit 6-2. The receiving section 22A of the distribution unit 6-1 transfers the received image data to the filtering section 22H. The filtering section 22H gains only the data necessary in the head controller 7 connected to the distribution board unit 11 connected to this receiving board unit 10 from the received image data and transfers the data to the data storage processor 22B. In this embodiment, the filtering section 22H gains the image data of the lines allocated to the heads 8-1 to 8-12 of the head row 9-1 and transfers the image data to the data storage processor 22B. The data storage processor 22B stores the received image data in the memory 23.

The distribution unit 6-2 receives the image data of each color transmitted from the distribution unit 6-1 and transmits the received image data of each color to the transmission unit 5 which is the next (lower) unit. By receiving the transmitted image data, the transmission unit 5 can grasp the communication state in the ring-type network. The receiving section 22A of the distribution unit 6-2 transfers the received image data to the filtering section 22H. The filtering section 22H gains only the data necessary in the head controller 7 connected to the distribution board unit 11 connected to this receiving board unit 10 from the received image data and transfers the data to the data storage processor 22B. In this embodiment, the filtering section 22H gains the image data of the lines allocated to the heads 8-13 to 8-24 of the head row 9-2 and transfers the image data to the data storage processor 22B. The data storage processor 22B stores the received image data in the memory 23.

In this way, only the image data necessary to control the heads 8 connected to each distribution unit 6 can be appropriately stored in the memory 23 of each distribution unit 6.

Next, a process of transmitting the image data by the receiving board unit 10 of the printer 3 will be described.

Figure 14:
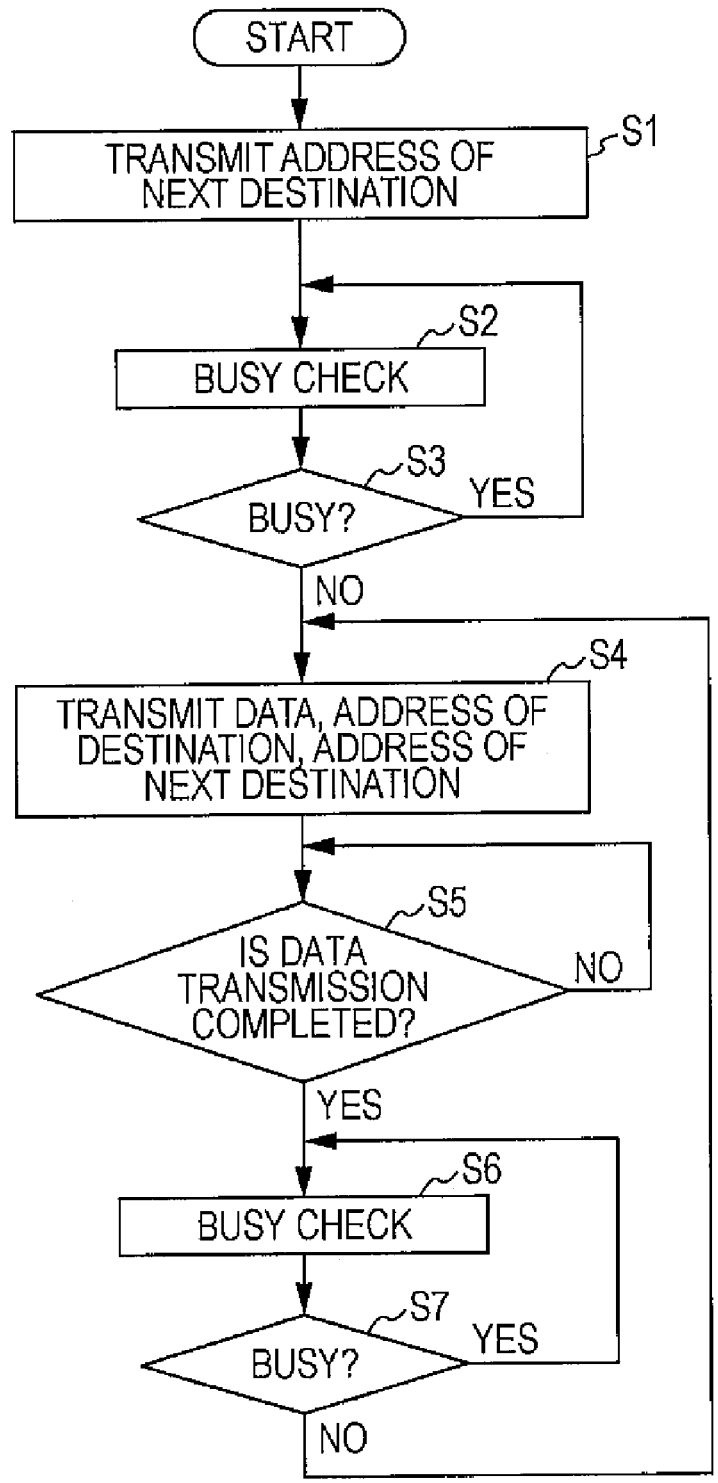
FIG. 14 is a flowchart illustrating a process of transmitting the image data by the receiving board unit according to the first embodiment of the invention.

FIG. 14 is a flowchart illustrating the process of transmitting the image data by the receiving board unit according to the first embodiment of the invention.

The process of transmitting the image data starts after the necessary image data are stored in the memory 23 of the receiving board unit 10.

First, the address of the destination indicating the head controller 7 of the destination to which the image data is initially transmitted is transferred as the address of the next destination to the data transmitting section 22F by the destination address generating section 22E. The data transmitting section 22F transmits the address of the next destination to the distribution board unit 11-1 through the connector 21 (step S1). In this way, the busy signal indicating whether the image data can be received from the distribution board unit 11 corresponding to the address of the next destination is returned from the distribution board unit 11-1.

The read address generating section 22C also generates the address of the memory 23 reading the image data to be transmitted subsequently and transfers the generated address to the data reading processor 22D. The data reading processor 22D reads the image data stored in the transferred address from the memory 23 and transfers the read image data to the data transmitting section 22F. In this way, the image data is stored in the data transmitting section 22F. On the other hand, the destination address generating section 22E generates the address of the destination transmitting the image data and the address of the next destination subsequently transmitting the image data, and outputs the generated addresses to the data transmitting section 22F.

The busy managing section 22G checks the busy signal received through the connector 21 (step S2). When the busy signal indicates that the image data cannot be received (in a busy case) (YES in step S3), the process returns to step S2. Alternatively, when the busy signal indicates that the image data can be received (NO in step S3), this result is notified to the data transmitting section 22F.

The data transmitting section 22F transmits the image data stored in the inner memory, the address of the destination, and the address of the next destination to the distribution board unit 11-1, and also sets the valid signal to the H state to transmit the valid signal (step S4). In this way, the busy signal indicating whether the image data can be received from the distribution board unit 11 corresponding to the address of the next destination is returned from the distribution board unit 11-1.

The read address generating section 22C also generates the address of the memory 23 reading the image data to be transmitted subsequently and transfers the generated address to the data reading processor 22D. The data reading processor 22D reads the image data stored in the transferred address from the memory 23 and transfers the read image data to the data transmitting section 22F. In this way, the image data is stored in the inner memory of the data transmitting section 22F. On the other hand, the destination address generating section 22E generates the address of the destination transmitting the image data and the address of the next destination subsequently transmitting the image data, and outputs the generated addresses to the data transmitting section 22F.

The data transmitting section 22F determines whether the data transmission in step S4 is completed (step S5). When it is determined that the data transmission is not completed (NO in step S5), the data transmission section 22F waits until the data transmission is completed.

Alternatively, when it is determined that the data transmission is completed (YES in step S5), the busy managing section 22G checks the busy signal received through the connector 21 (step S6). When the busy signal indicates that the image data cannot be received (in the busy case) (YES in step S7), the process returns to step S6. Alternatively, when the busy signal indicates that the image data can be received (NO in step S7), this result is notified to the data transmitting section 22F. In this way, the process after step S4 is executed and the image data is transmitted to the next destination.

Next, a detailed example of the process of transmitting image data will be described with reference to FIG. 15.

Figure 15:
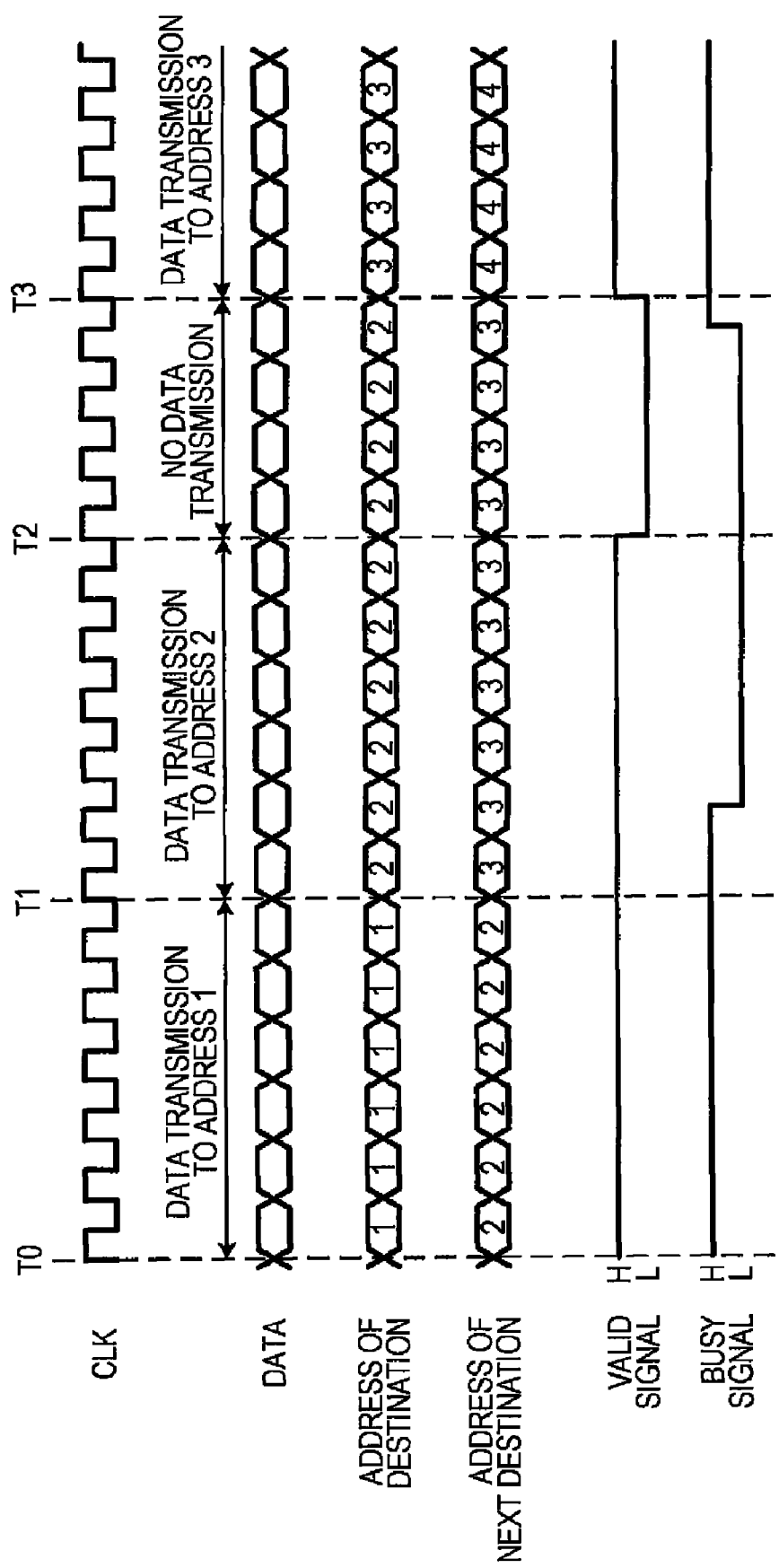
FIG. 15 is a timing chart of various signals relevant to the transmission of the image data according to the first embodiment of the invention.

FIG. 15 is a timing chart of various signals relevant to the transmission of the image data according to the first embodiment of the invention.

When it is determined in step S3 in FIG. 14 that the first destination can receive image data, the data transmitting section 22F repeatedly transmits one-clock data DATA of the image data, the address ("1") of the destination, the address ("2") of the next destination to destination "1" (first destination) at each clock of a clock signal CLK, as shown in time subsequent to time T0 in FIG. 15. In addition, the data transmitting section 22F sets the valid signal to the H state and transmits the valid signal.

Until the transmission of the image data to the destination "1" is completed, the busy signal from the next destination "2" is returned. Here, since the busy signal is in the H state at time T1 at which the transmission of the image data to the destination "1" is completed, the busy signal indicates that the next destination "2" can receive the image data.

After the transmission of the image data to the destination "1" is completed, the data transmitting section 22F repeatedly transmits one-clock data DATA of the image data (first destination), the address ("2") of the destination, the address ("3") of the next destination to destination "2" at each clock of a clock signal CLK, as shown in time subsequent to time T1. In addition, the data transmitting section 22F sets the valid signal to the H state and transmits the valid signal.

Until the transmission of the image data to the destination "2" is completed, the busy signal from the next destination "3" is returned. Here, since the busy signal is in the L state at time prior to time T2, the busy signal indicates that the next destination "3" cannot receive the image data.

Since the busy signal is also in the L state at time T2 at which the transmission of the image data to the destination "2" and indicates that the next destination "3" cannot receive the image data, the data transmitting section 22F does not transmit the image data to the destination "3". In this case, the data transmitting section 22F transmits the address ("2") of the destination and the address ("3") of the next destination at each clock of the clock signal CLK. In addition, the data transmitting section 22F sets the valid signal to the L state indicating that the data is not valid and transmits the valid signal.

When the state of the busy signal is changed to the H state, the busy signal indicates that the next destination "3" can receive the image data. Therefore, as shown in time subsequent to time T3, the data transmitting section 22F repeatedly transmits one-clock data DATA of the image data, the address ("3") of the destination, and the address ("4") of the next destination to the destination "3" at each clock of the clock signal CLK. In addition, the data transmitting section 22F sets the valid signal to the H state and transmits the valid signal.

Figure 16:
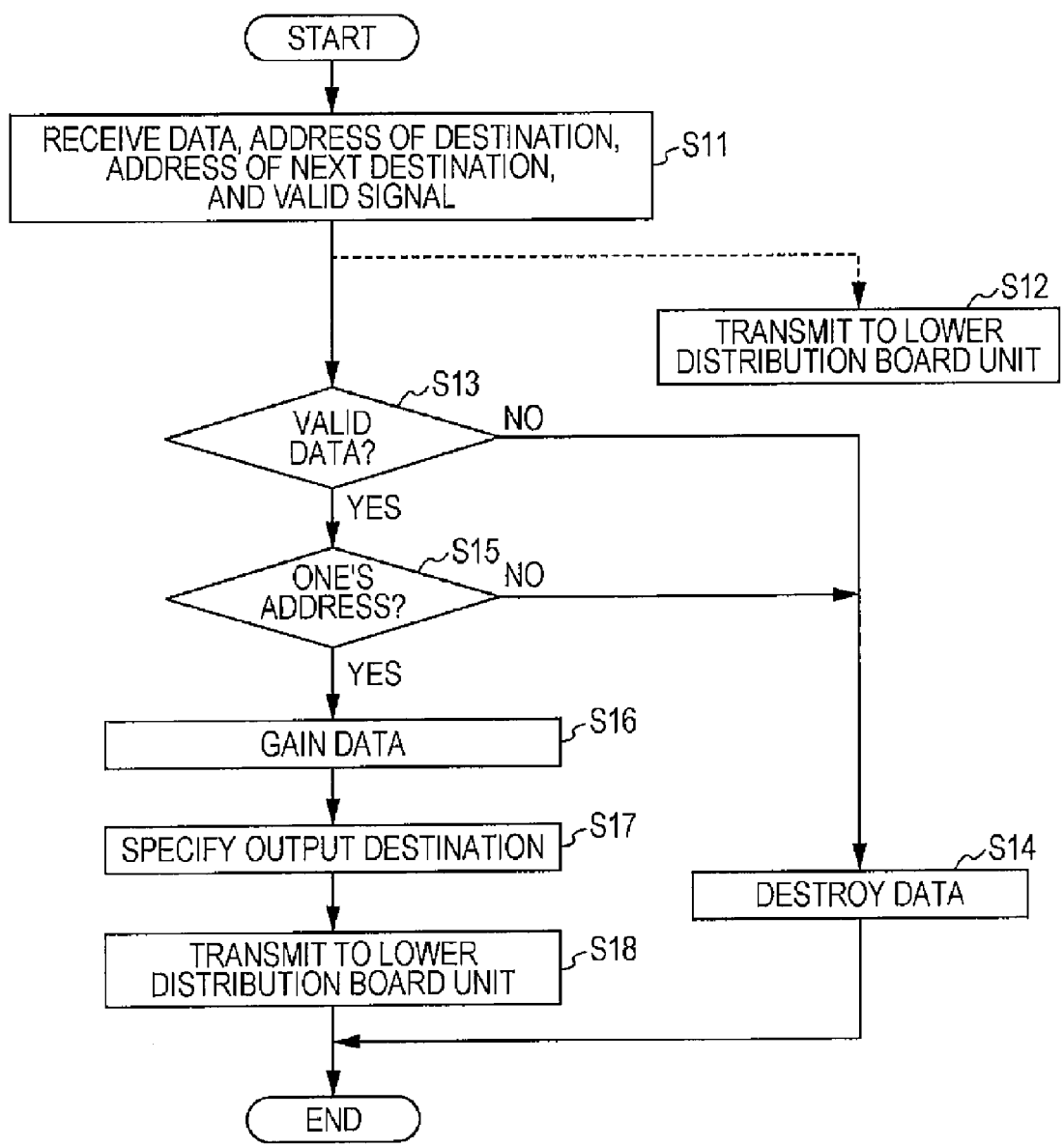
FIG. 16 is a flowchart illustrating a process of receiving the image data by the distribution board unit according to the first embodiment of the invention.

FIG. 16 is a flowchart illustrating a process of receiving the image data by the distribution board unit according to the first embodiment of the invention.

The receiving section 26A of the distribution board unit 11 receives the data, the address of the destination, the address of the next destination, and the valid signal from the unit (the receiving board unit 10 or the upper distribution board unit 11) (step S11).

When the lower distribution board unit 11 exists, the receiving section 26A transmits the data, the address of the destination, the address of the next destination, and the valid signal to the lower distribution board unit 11 at the clock (step S12).

The receiving section 26A determines whether the valid signal indicates that the data is valid (step S13). When it is determined that the data is not valid, the data is destroyed (step S14) and the process ends.

Alternatively, when the valid signal indicates that the data is valid (YES in step S13), the data and the address of the destination are transferred to the data self-determining section 26C. The data self-determining section 26C determines whether the address of the destination indicates the head controller 7 connected to this distribution board unit 11, that is, the address of the destination contains the identity information of this distribution board unit 11 (step S15). When it is determined that the address of the destination does not contain the identity information of this distribution board unit 11 (NO in step S15), the data is destroyed (step S14). Then, the process ends.

Alternatively, when it is determined that the address of the destination contains the identity information of this distribution board unit 11 (YES in step S15), the data self-determining section 26C gains the data and the address of the destination and transfers the data and the address of the destination to the destination determining section 26D (step S16). Subsequently, the destination determining section 26D specifies the head controller 26E corresponding to the address of the destination (step S17) and transmits the image data to the specified head controller transmission section 26E. The head controller transmission section 26E transmits the transmitted image data to the head controller 7 through the slot 27 (step S18). In this way, the head controller 7 controls the head 8 connected to this head controller on the basis of the image data.

Next, a printer according to a second embodiment of the invention will be described.

The printer according to the second embodiment of the invention and the printer according to the first embodiment in FIG. 1 are different from each other in the configuration and arrangement of the heads. The function of the filtering section 22H of the receiving board unit 10 is also different. In addition, other configurations are the same.

Figure 17A:
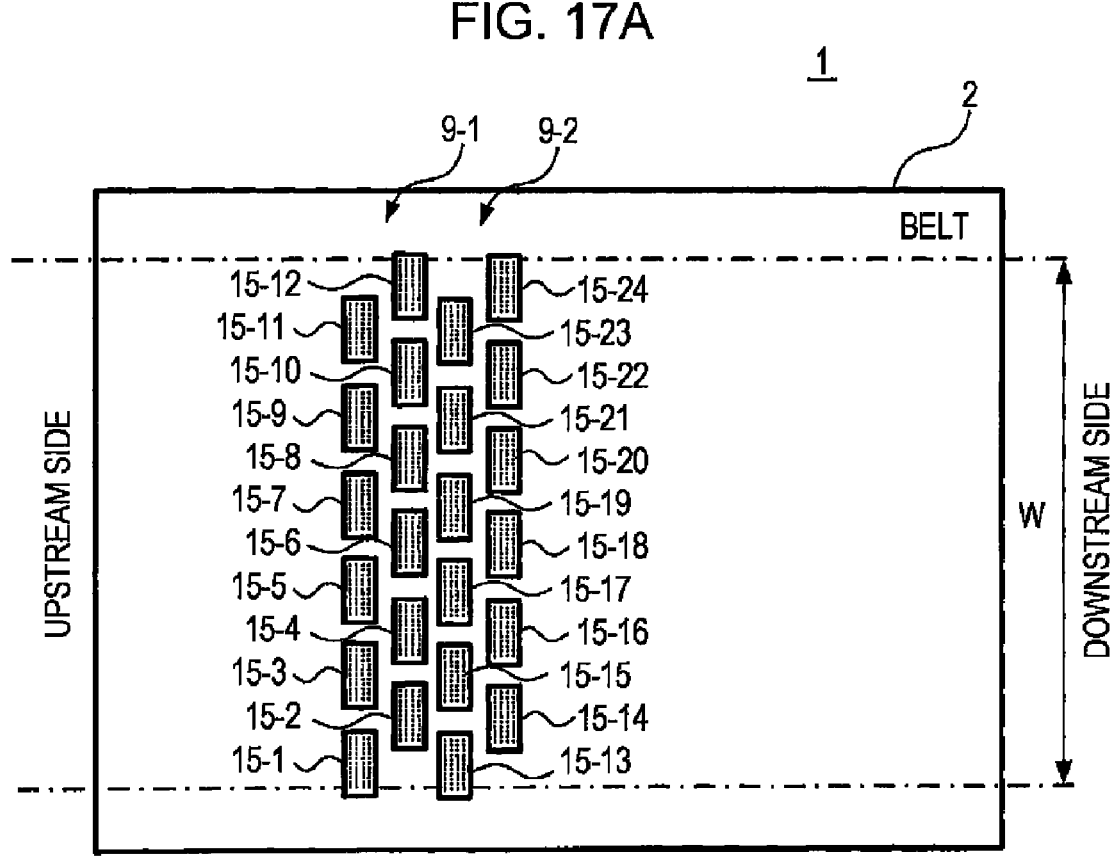
FIGS. 17A and 17B are diagrams illustrating the arrangement and configuration of heads according to a second embodiment of the invention.
Figure 17B:
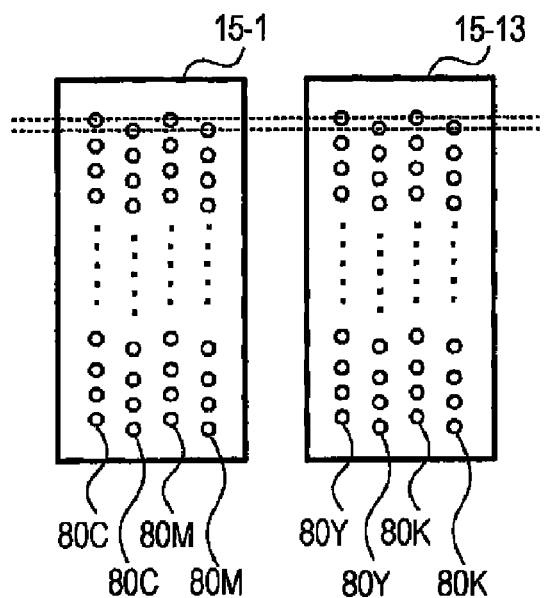

FIGS. 17A and 17B are diagrams illustrating the arrangement and configuration of heads according to the second embodiment of the invention. FIG. 17A shows the arrangement of the heads on the surface of the printer 3. FIG. 17B shows the surfaces of the heads. FIGS. 17A and 17B show the projected shape of nozzles from the upper surface.

In the printer 3 according to this embodiment, a plurality of head rows 9-1 and 9-2 is disposed. The head row 9-1 performs printing with cyan and magenta ink. The head row 9-2 performs printing with yellow and blacks.

The heads 15 (15-1 to 15-24) according to this embodiment each include four nozzle rows in which nozzles 80C, 80M, 80Y and 80K are arranged in the width direction, as shown in FIG. 17B. Two nozzle rows on the upstream side and two nozzle rows on the downstream side are the nozzle rows ejecting different one color ink. That is, in the heads 15-1 to 15-12, the two nozzle rows on the upstream side are the nozzle rows ejecting cyan ink and the two nozzle rows on the downstream side are the nozzle rows ejecting magenta ink. In the heads 15-13 to 15-24, the two nozzle rows on the upstream side are the nozzle rows ejecting yellow ink and the two nozzle rows on the downstream side are the nozzle rows ejecting black ink. The nozzles of the two nozzle rows ejecting the respective ink in the width direction Y are deviated from each other by half of the nozzle pitch. With such a configuration, the heads 15 are configured to perform printing with the double resolution of an image that is formed by just one head row.

In this embodiment, the arrangement positions of the nozzles 80C and 80M of the heads 15-1 to 15-12 of the head row 9-1 in the width direction are the same as the arrangement positions of the nozzles 80Y and 80K of the heads 15-13 to 15-24 of the head row 9-2 in the width direction.

In this embodiment, the hardware configuration of the receiving board unit 10 is the same as that of the receiving board unit 10 according to the first embodiment. However, by setting different setting information in the receiving board unit 10, the filtering section 22H is configured to have a function different from that according to the first embodiment.

In the filtering section 22H, colors which are the gain target in the image data are set. The filtering section 22H gains only the necessary color image data from the image data on the basis of the setting (extraction condition). For example, the filtering section 22H of the receiving board unit 10 of the distribution unit 6-1 is configured to gain cyan and magenta image data. The filtering section 22H of the receiving board unit 10 of the distribution unit 6-2 is configured to gain yellow and black image data. The setting of the filtering section 22H is performed on the basis of the gain target colors in the distribution setting information shown in FIG. 2.

The image forming system according to the second embodiment can appropriately transmit the image data necessary in the distribution unit, that is, the necessary color image data, to the distribution units.

The embodiments of the invention have been described. The invention is not limited to the forgoing embodiments, but may be modified in various forms.

For example, in the above-described embodiment, the head row includes the plurality of heads, which is each capable of printing only a part of the maximum printable width, in order to print the whole of the maximum printable width. The heads are arranged so as to print the whole of the maximum printable width. However, the invention is not limited thereto. There may be provided one head capable of printing the whole of the maximum printable width, that is, one head in which a plurality of nozzles is arranged so as to print the whole of the maximum printable width. In the above-described embodiments, the plurality of nozzles is arranged in the width direction, but the invention is not limited thereto. The plurality of nozzles may be arranged in a direction different from the width direction, for example, in a direction intersecting the transport direction. In other words, the nozzles may be arranged as a whole in the width direction.

In the above-described embodiments, the head controller 7 controlling the plurality of nozzles (nozzle group) of the head as the minimum unit are used, but the invention is not limited thereto. For example, a controller may be provided to control a part of the nozzle group of the head as unit and the distribution board unit may transmit the corresponding image data to one or more controllers.

In the above-described embodiments, two distribution units 6 are used, but the invention is not limited thereto. Three or more distribution units 6 may be used. In this case, configuration can be realized easily by preparing the necessary number of the same distribution units 6 and connecting them. When the printer 3 is expanded, the configuration can be realized easily by newly preparing the same distribution units 6 and connecting them.

In the above-described embodiments, the transmission unit 5 and the plurality of distribution units 6 are connected to each other to form the ring-type network, but the invention is not limited thereto. The transmission unit 5 and the plurality of distribution units 6 may be cascaded by disposing the transmission unit 5 at the front position.

In the above-described embodiments, the image data, the address of the destination, and the address of the next destination are collectively transmitted by different signal lines at one clock. However, the invention is not limited thereto. The image data, the address of the destination, and the address of the next destination are collectively transmitted by the same signal line.

In the above-described embodiments, the receiving board unit 10 and the plurality of distribution board units 11-1 to 11-3 are cascaded, but the invention is not limited thereto. For example, the receiving board unit 10 and the plurality of distribution board units 11-1 to 11-3 are connected to form a bus-type network. In other words, the receiving board unit and the distribution board units are configured so that the data are directly or indirectly transmitted from the receiving board unit 10 to the distribution units 11-1 to 11-3.

In the above-described embodiments, the address of the destination and the address of the next destination are simultaneously transmitted, but the invention is not limited thereto. The address of the next destination may be transmitted at least before the transmission of the image data to the destination ends. With such a configuration, the determination result is rapidly returned after the transmission of the image data to the destination ends, compared to a case where an inquiry about the state of the next destination starts. Therefore, since the transmission of the image data to the next destination rapidly starts, it is possible to improve communication efficiency.

In the above-described embodiments, the two head rows are disposed in the transport direction, but the invention is not limited thereto. One head row may be disposed or three or more head rows may be disposed in the transport direction.

In the above-described embodiments, one distribution unit 6 takes charge of the heads 8 of one head row 9, but the invention is not limited thereto. For example, the plurality of distribution units 6 may take charge of the heads 8 of one head row 9 or one distribution unit 6 may take charge of the heads 8 of the plurality of head rows 9.

In the above-described embodiments, the line ink jet printer is used as an example of the image forming apparatus, but the invention is not limited thereto. The invention is also applicable to an image forming apparatus ejecting a liquid other than ink or an image forming apparatus dispersing powder-like material such as toner.

The entire disclosure of Japanese Patent Application No. 2008-328544, filed Dec. 24, 2008 is expressly incorporated by reference herein.

What is claimed is:

1. An image forming apparatus comprising:
a plurality of controllers which controls a nozzle group forming an image on an image forming medium on the basis of image data; and
a plurality of distribution units which is connected to one or more controllers and transmits the image data, which is used to control the nozzle group controlled by the controller, to the controller,
wherein upper and lower distribution units are connected to each other in a communicable way from a first distribution unit, which is the uppermost unit, to a second distribution unit, which is the lowermost unit, and the first distribution unit is connected to an external apparatus in a communicable way, and
wherein the distribution unit includes an image receiving section which receives the image data of the entire image of an image forming target from the external apparatus or the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit.

2. The image forming apparatus according to claim 1,
wherein in the nozzle group, nozzles line up in a direction intersecting a transport direction of the image forming medium, and
wherein the image data, of the entire image received by the image receiving section has a data format in which pixel data from the forefront pixel to the last pixel in the transport direction are sequentially arranged in each line oriented in the transport direction of the image.

3. The image forming apparatus according to claim 1, further comprising:
a memory which stores the necessary image data extracted by the extraction section,
wherein the memory includes a plurality of memory blocks each having a capacity of successively arranging and storing the pixel data, which are supplied to control all of the nozzles oriented in a direction perpendicular to the transport direction and controlled by the controller connected to the distribution unit, by the number of pixels of the image in the transport direction, and
wherein the image forming apparatus further comprises a storage section storing each pixel data of the necessary image data at a position corresponding to the controlling target nozzle in the memory blocks.

4. The image forming apparatus according to claim 1,
wherein the nozzle group controlled by the controller connected to the distribution unit is disposed so as to form an image of pixels of some lines in a direction perpendicular to the transport direction, and
wherein the extraction section extracts pixel data of pixels of lines of an image, which is formed by the nozzle group controlled by the controller connected to the distribution unit, as the necessary image data.

5. The image forming apparatus according to claim 1,
wherein the nozzle group controlled by the controller connected to the distribution unit forms the image of some colors of plural colors contained in the entire image, and
wherein the extraction unit extracts pixel data of color pixels of an image, which is formed by the nozzle group controlled by the controller connected to the distribution unit, as the necessary image data.

6. The image forming apparatus according to claim 1,
wherein the second distribution unit is connected to the external apparatus in a communicable way, and
wherein the image transmitting section of the second distribution unit transmits the image data of the entire image to the external apparatus.

7. The image forming apparatus according to claim 1, further comprising an extraction condition receiving section which receives the extraction condition from the external apparatus.

8. An image forming system comprising:
a processing apparatus which generates image data of an entire image; and
an image forming apparatus which forms the image on the basis of the image data,
wherein the processing apparatus includes a transmission unit transmitting the image data to, the image forming apparatus,
wherein the image forming apparatus includes a plurality of controllers which controls a nozzle group forming the image on the image forming medium on the basis of the image data and a plurality of distribution units which is connected to one or more controllers and transmits the image data, which is used to control the nozzle group controlled by the controller, to the controller,
wherein upper and lower distribution units are connected to each other in a communicable way from a first distribution unit, which is the uppermost unit, to a second distribution unit, which is the lowermost unit, and the first distribution unit is connected to an external apparatus in a communicable way, and
wherein the distribution unit of the image forming apparatus includes an image receiving section which receives the image data of the entire image of an image forming target from the transmission unit or the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit.

9. A head device comprising:
a head which is provided with a nozzle group forming an image on an image forming medium;
one or more controllers which control the nozzle group of the head on the basis of image data; and
distribution units which are connected to one or more controllers and transmit the image data, which is used to control the nozzle group controlled by the controller, to the controller,
wherein the distribution unit is connected to an upper distribution unit in a communicable way and connected to a lower distribution unit in a communicable way, and
wherein the distribution unit includes an image receiving section which receives the image data of the entire image of an image forming target from the upper distribution unit, an extraction section which extracts necessary image data, which is data necessary for control of the controller connected to the distribution unit, from the image data of the entire image in accordance with a predetermined extraction condition, and an image transmitting section which transmits the image data of the entire image to the lower distribution unit.

* * * * *